(12) United States Patent
Greenspan et al.

(10) Patent No.: US 12,417,552 B2
(45) Date of Patent: Sep. 16, 2025

(54) SYSTEMS AND METHODS FOR POSE ESTIMATION VIA RADIAL VOTING BASED KEYPOINT LOCALIZATION

(71) Applicant: BLUEWRIST INC., Markham (CA)

(72) Inventors: Michael Greenspan, Kingston (CA); Mohsen Zand, Kingston (CA); Seyed Ali Etemad, Ottawa (CA); Yangzheng Wu, Kingston (CA)

(73) Assignee: BLUEWRIST INC., Ontario (CA)

( * ) Notice: Subject to any disclaimer, the term of this patent is extended or adjusted under 35 U.S.C. 154(b) by 349 days.

(21) Appl. No.: 18/131,060

(22) Filed: Apr. 5, 2023

(65) Prior Publication Data

US 2023/0316563 A1 Oct. 5, 2023

Related U.S. Application Data

(60) Provisional application No. 63/327,618, filed on Apr. 5, 2022.

(51) Int. Cl.
*G06K 9/00* (2022.01)
*G06T 7/11* (2017.01)
(Continued)

(52) U.S. Cl.
CPC .................. *G06T 7/73* (2017.01); *G06T 7/11* (2017.01); *G06T 7/50* (2017.01);
(Continued)

(58) Field of Classification Search
CPC ..... G06T 7/73; G06T 7/11; G06T 7/50; G06T 2207/10024; G06T 2207/10028;
(Continued)

(56) References Cited

U.S. PATENT DOCUMENTS 9,280,827 B2 * 3/2016 Tuzel .................. G06T 7/75
10,692,244 B2 * 6/2020 Gu ..................... G06T 7/579
(Continued)

OTHER PUBLICATIONS

Radial Voting Based Keypoint and 6DoF Pose Estimation, Yangzheng Wu, Feb. 2022, pp. i to 78 (Year: 2022).*
(Continued)

*Primary Examiner* — Jayesh A Patel
(74) *Attorney, Agent, or Firm* — Stephen Leonard; Aird & McBurney LP

(57) ABSTRACT

Systems and methods are disclosed that facilitate object pose determination via keypoint detection. A machine learning algorithm is employed to facilitate voting-based estimation of the locations of at least three keypoints. In some example embodiments, the machine learning algorithm is trained, based on reference intensity-depth images of an object, to determine a radial distance between a keypoint and a 3D scene location associated with each pixel. At inference, the algorithm is employed to process an intensity-depth image to determine radial distance estimates for each pixel, and these radial distances are employed to increment an accumulator space, such that a sphere is generated in the accumulator space for each pixel, centered on the 3D scene location, and a keypoint location is determined by a peak in the accumulator space, with multiple keypoints enabling pose determination. The methods are adapted to other imaging modalities, including non-depth images and point cloud datasets.

38 Claims, 20 Drawing Sheets

(51) Int. Cl.
  *G06T 7/50* (2017.01)
  *G06T 7/73* (2017.01)
(52) U.S. Cl.
  CPC .............. *G06T 2207/10024* (2013.01); *G06T 2207/10028* (2013.01); *G06T 2207/20081* (2013.01); *G06T 2207/20084* (2013.01)
(58) Field of Classification Search
  CPC . G06T 2207/20081; G06T 2207/20084; G06T 2207/20076
  See application file for complete search history.

(56) References Cited

U.S. PATENT DOCUMENTS

| | | | | |
|---|---|---|---|---|
| 11,967,103 | B2* | 4/2024 | Zheng | G06V 10/7753 |
| 2010/0278384 | A1* | 11/2010 | Shotton | G06F 3/017 |
| | | | | 382/103 |
| 2013/0300831 | A1* | 11/2013 | Mavromatis | G01C 15/00 |
| | | | | 348/46 |
| 2020/0151512 | A1* | 5/2020 | Corral-Soto | G06F 18/217 |
| 2020/0302160 | A1* | 9/2020 | Hashimoto | G06T 7/73 |
| 2021/0150264 | A1* | 5/2021 | Karanam | G06N 3/045 |
| 2022/0156965 | A1* | 5/2022 | Zheng | G06V 10/806 |

OTHER PUBLICATIONS

Keypoint Cascade Voting for Point Cloud Based 6DoF Pose Estimation, Yangzheng Wu et al., IEEE, 2022, pp. 176-186 (Year: 2022).*

Visual Attention and Color Cues for 6D Pose Estimation on Occluded Scenarios Using RGB-D Data, Joel Vidal et al., MDPI, 2021, pp. 1-20 (Year: 2021).*

6-DoF Object Pose from Semantic Keypoints, Georgios Pavlakos et al., IEEE, 2017, pp. 2011 to 2018 (Year: 2011).*

Keypoints-based surface representation for 3D modeling and 3D object recognition, Syed Afaq Ali Shah et al., Elsevier, 2016, pp. 29-38 (Year: 2016).*

Choi, C. et al., "3D Pose Estimation of Daily Objects Using an RGB-D Camera", 2012 IEEE/RSJ International Conference on Intelligent Robots and Systems, 2012, 10.1109/IROS.2012.6386067, 8 pages.

Msheng H. et al., "PVN3D: A Deep Point-wise 3D Keypoints Voting Network for 6DoF Pose Estimation", PVN3D: A Deep Point-Wise 3D Keypoints Voting Network for 6DoF Pose Estimation. CVPR 2020: 11632-11641.

Hu, Y. et al., "Segmentation-driven 6D Object Pose Estimation", 2019 IEEE/CVF Conference on Computer Vision and Pattern Recognition (CVPR), 10.1109/CVPR.2019.00350, 3385-3394.

Liu, H. et al., "A 3D Keypoints Voting Network for 6DoF Pose Estimation in Indoor Scene", Machines 2021, 9, 230. https://doi.org/10.3390/machines9100230, 16 pages.

Peng, S. et al., "PVNet: Pixel-wise Voting Network for 6DoF Pose Estimation", PVNet: Pixel-wise Voting Network for 6DoF Pose Estimation, arXiv: 1812.11788, 2018, 10 pages.

Qi, C. et al., "Deep Hough Voting for 3D Object Detection in Point Clouds", Deep Hough Voting for 3D Object Detection in Point Clouds, arXiv:1904.09664v2, 2019, 14 pages.

Vidal, J. et al., "Visual Attention and Color Cues for 6D Pose Estimation on Occluded Scenarios Using RGB-D Data", Sensors 2021, 21, 8090. https://doi.org/10.3390/s21238090, 20 pages.

Xiang, Y. et al., "PoseCNN: A Convolutional Neural Network for 6D Object Pose Estimation in Cluttered Scenes", PoseCNN: A Convolutional Neural Network for 6D Object Pose Estimation in Cluttered Scenes, arXiv:1711.00199v3, 10 pages.

Zhuang, C. et al., "Semantic part segmentation method based 3D object pose estimation with RGB-D images for bin- picking", Rob. and Comp.—Integ. Manu. 68 (2021) 102086, 13 pages.

* cited by examiner

|  | $\bar{r}$ [mm] | $\bar{\epsilon}$ [mm] | | | | | |
|---|---|---|---|---|---|---|---|
|  |  | vector | | offset | | radial | |
|  |  | $\mu_v$ | $\sigma_v$ | $\mu_o$ | $\sigma_o$ | $\mu_r$ | $\sigma_r$ |
| ape | 61.2 | 10.0 | 5.8 | 5.8 | 2.6 | 1.3 | 0.7 |
| driller | 129.4 | 10.0 | 2.3 | 6.5 | 4.7 | 2.2 | 1.0 |
| eggbox | 82.5 | 11.8 | 5.3 | 5.2 | 2.7 | 2.0 | 0.7 |

FIG. 6A

|  | $\bar{r}$ [mm] | $\bar{\epsilon}$ [mm] | | | | | |
|---|---|---|---|---|---|---|---|
|  |  | vector | | offset | | radial | |
|  |  | $\mu_v$ | $\sigma_v$ | $\mu_o$ | $\sigma_o$ | $\mu_r$ | $\sigma_r$ |
| ape | 142.1 | 12.5 | 7.6 | 10.4 | 5.3 | 1.8 | 0.8 |
| driller | 318.8 | 11.3 | 8.2 | 9.5 | 3.5 | 2.7 | 0.8 |
| eggbox | 197.3 | 13.7 | 8.5 | 11.4 | 4.7 | 2.4 | 1.2 |

FIG. 6B

| Mode | Method | ADD(s) [%] | |
|---|---|---|---|
| | | LINEMOD | Occ. LINEMOD |
| RGB | SSD6D [19] | 9.1 | - |
| | Oberweger [30] | - | 27.1 |
| | Hu et al. [18] | - | 30.4 |
| | Pix2Pose [33] | 72.4 | 32.0 |
| | DPOD [50] | 83.0 | 32.8 |
| | PVNet [36] | 86.3 | 40.8 |
| | DeepIM [22] | 88.6 | - |
| | PPRN [45] | 93.9 | 58.4 |
| RGB +D ref | YOLO6D [44] | 56.0 | 6.4 |
| | SSD6D+ref [19] | 34.1 | 27.5 |
| | PoseCNN [49] | - | 24.9 |
| | DPOD+ref [50] | 95.2 | 47.3 |
| RGB-D | DenseFusion [47] | 94.3 | - |
| | PVN3D [14] | 99.4 | 63.2 |
| | RCVPose | 99.4 | 70.2 |
| | RCVPose+ICP | 99.7 | 71.1 |

FIG. 9 ape driller duck eggbox

| Refine? | Method | ADD(s) [%] | AUC [%] |
|---|---|---|---|
| No | PoseCNN [49] | 59.9 | 75.8 |
| | DF (per-pixel) [47] | 82.9 | 91.2 |
| | PVN3D [14] | 91.8 | 95.5 |
| | RCVPose | 95.2 | 96.6 |
| Yes | PoseCNN [49] | 85.4 | 93.0 |
| | DF (iterative) [47] | 86.1 | 93.2 |
| | PVN3D [14]+ICP | 92.3 | 96.1 |
| | RCVPose+ICP | 95.9 | 97.2 |

FIG. 11

| $\rho$ [mm] | $\bar{\epsilon}$ [mm] $\mu_r$ | $\sigma_r$ | ADD [%] | speed [fps] | memory [Mbyte] |
|---|---|---|---|---|---|
| 1 | 1.75 | 0.81 | 61.5 | 5 | $4 \times 479^3 = 440$ |
| 2 | 2.33 | 0.52 | 61.3 | 12 | $4 \times 239^3 = 55$ |
| 4 | 6.27 | 0.72 | 61.3 | 20 | $4 \times 118^3 = 6.5$ |
| 5 | 6.33 | 0.69 | 61.3 | 24 | $4 \times 95^3 = 3.4$ |
| 8 | 11.73 | 2.37 | 55.2 | 32 | $4 \times 58^3 = 0.8$ |
| 16 | 17.92 | 5.52 | 45.7 | 40 | $4 \times 28^3 = 0.09$ |

FIG. 12

| | Number of Keypoints | | |
|---|---|---|---|
| | 3 | 4 | 8 |
| ape | 61.3 | 60.9 | 61.3 |
| driller | 78.8 | 78.6 | 78.8 |
| eggbox | 82.3 | 82.6 | 82.3 |

| Mode | Method | ape | bench-vise | camera | can | cat | driller | duck | eggbox* | glue* | hole-puncher | iron | lamp | phone | mean |
|---|---|---|---|---|---|---|---|---|---|---|---|---|---|---|---|
| RGB | SSD6D+ref [19] | 2.6 | 15.1 | 6.1 | 27.3 | 9.3 | 12.0 | 1.3 | 2.8 | 3.4 | 3.1 | 14.6 | 11.4 | 9.7 | 9.1 |
| | Pix2Pose [30] | 58.1 | 91 | 60.9 | 84.4 | 65 | 76.3 | 43.8 | 96.8 | 79.4 | 74.8 | 83.4 | 82 | 45 | 72.4 |
| | DPOD [49] | 53.3 | 95.3 | 90.4 | 94.1 | 60.4 | 97.7 | 66 | 99.7 | 93.8 | 65.8 | 99.8 | 88.1 | 74.2 | 83.0 |
| | PVNet [31] | 43.62 | 99.9 | 86.9 | 95.5 | 79.3 | 96.4 | 52.6 | 99.2 | 95.7 | 81.9 | 98.9 | 99.3 | 92.4 | 86.3 |
| | PPRN [3] | 84.5 | 98.7 | 93.7 | 97.8 | 87.3 | 96.9 | 88.5 | 98.5 | 99.5 | 84.5 | 99.1 | 98.7 | 92.5 | 93.9 |
| | DeepIM [20] | 77 | 97.5 | 93.5 | 96.5 | 82.1 | 95.0 | 77.7 | 97.1 | 99.4 | 52.8 | 98.3 | 97.5 | 87.7 | 88.6 |
| RGB +D ref | YOLO6D [44] | 21.6 | 81.8 | 36.6 | 68.8 | 41.8 | 63.5 | 27.2 | 69.6 | 80 | 42.6 | 75 | 71.1 | 47.7 | 56.0 |
| | SSD6D+ref [19] | - | - | - | - | - | - | - | - | - | - | - | - | - | 34.1 |
| | DPOD+ref [49] | 87.7 | 98.5 | 96.1 | 99.7 | 94.7 | 98.8 | 86.3 | 99.9 | 96.8 | 86.8 | 100 | 96.8 | 94.7 | 95.2 |
| RGB-D | DenseFusion [47] | 92.3 | 93.2 | 94.4 | 93.1 | 96.5 | 87.0 | 92.3 | 99.8 | 100.0 | 92.1 | 97.0 | 95.3 | 92.8 | 94.3 |
| | PVN3D [14] | 97.3 | 99.7 | 99.6 | 99.5 | 99.8 | 99.3 | 98.2 | 99.8 | 100.0 | 99.9 | 99.7 | 99.8 | 99.5 | 99.4 |
| | RCVPose | 99.2 | 99.6 | 99.7 | 99 | 99.4 | 99.7 | 99.4 | 98.7 | 99.7 | 99.8 | 99.9 | 99.2 | 99.1 | 99.43 |
| | RCVPose+ICP | 99.6 | 99.7 | 99.7 | 99.3 | 99.7 | 100 | 99.7 | 99.3 | 100.0 | 100 | 99.9 | 99.5 | 99.7 | 99.7 |

FIG. 16

| Mode | Method | ape | can | cat | driller | duck | eggbox* | glue* | holepuncher | ADD(s)[%] |
|---|---|---|---|---|---|---|---|---|---|---|
| RGB | Oberweger [30] | 12.1 | 39.9 | 8.2 | 45.2 | 17.2 | 22.1 | 35.8 | 36.0 | 27.1 |
| | Hu et al. [18] | 17.6 | 53.9 | 3.3 | 62.4 | 19.2 | 25.9 | 39.6 | 21.3 | 30.4 |
| | Pix2Pose [33] | 22.0 | 44.7 | 22.7 | 44.7 | 15.0 | 25.2 | 32.4 | 49.5 | 32.0 |
| | DPOD [50] | - | - | - | - | - | - | - | - | 32.8 |
| | PVNet [36] | 15.8 | 63.3 | 16.7 | 25.2 | 65.7 | 50.2 | 49.6 | 39.7 | 40.8 |
| | PPRN [45] | - | - | - | - | - | - | - | - | 58.4 |
| RGB +D ref | YOLO6D [44] | - | - | - | - | - | - | - | - | 6.4 |
| | SSD6D+ref [19] | - | - | - | - | - | - | - | - | 27.5 |
| | PoseCNN [49] | 9.6 | 45.2 | 0.9 | 41.4 | 19.6 | 22.0 | 38.5 | 22.1 | 24.9 |
| | DPOD+ref [50] | - | - | - | - | - | - | - | - | 47.3 |
| RGB-D | PVN3D [14] | 33.9 | 88.6 | 39.1 | 78.4 | 41.9 | 80.9 | 68.1 | 74.7 | 63.2 |
| | RCVPose | 60.3 | 92.5 | 50.2 | 78.2 | 52.1 | 81.2 | 72.1 | 75.2 | 70.2 |
| | RCVPose+ICP | 61.3 | 93 | 51.2 | 78.8 | 53.4 | 82.3 | 72.9 | 75.8 | 71.1 |

|  | # of skip connections | | | |
|---|---|---|---|---|
|  | 3 | | 5 | |
|  | $\mu$ | $\sigma$ | $\mu$ | $\sigma$ |
| ape | 2.4 | 1.1 | 1.8 | 0.8 |
| driller | 3.6 | 1.2 | 2.7 | 0.8 |
| eggbox | 3.5 | 1.7 | 2.4 | 1.2 |

| | $\bar{r}$ [mm] | $\bar{r}$ [mm] | | | | | | | | | | | | |
|---|---|---|---|---|---|---|---|---|---|---|---|---|---|---|
| | | vector+offset | | vector+radial | | radial+offset | | vector+offset+radial | | vector | | offset | | radial | |
| | | $\mu_v$ | $\sigma_v$ | $\mu_v$ | $\sigma_v$ | $\mu_r$ | $\sigma_r$ | $\mu_r$ | $\sigma_r$ | $\mu_r$ | $\sigma_r$ | $\mu_r$ | $\sigma_r$ | $\mu_r$ | $\sigma_r$ |
| ape | 142.1 | 20.2 | 12.4 | 12.7 | 6.7 | 9.8 | 6.2 | 7.2 | 1.2 | 12.5 | 7.6 | 10.4 | 5.3 | 1.8 | 0.8 |
| driller | 318.8 | 22.3 | 11.7 | 13.3 | 7.9 | 8.7 | 3.4 | 5.7 | 2.3 | 11.3 | 8.2 | 9.5 | 3.5 | 2.7 | 0.8 |
| eggbox | 197.3 | 21.6 | 13.5 | 17.4 | 10.5 | 12.1 | 5.2 | 6.4 | 3.3 | 13.7 | 8.5 | 11.4 | 4.7 | 2.4 | 1.2 |

FIG. 21

SYSTEMS AND METHODS FOR POSE ESTIMATION VIA RADIAL VOTING BASED KEYPOINT LOCALIZATION

CROSS-REFERENCE TO RELATED APPLICATIONS

This application claims priority to U.S. Provisional Patent Application No. 63/327,618, titled "SYSTEMS AND METHODS FOR POSE ESTIMATION VIA RADIAL VOTING BASED KEYPOINT LOCALIZATION" and filed on Apr. 5, 2022, the entire contents of which is incorporated herein by reference.

BACKGROUND

The present disclosure relates to computer vision methods for pose estimation. More particularly, the present disclosure relates to methods of pose determination via keypoint localization.

Object pose estimation is an enabling technology for many applications including robot manipulation, human-robot interaction, augmented reality, virtual reality, and autonomous driving [36, 35, 46]. It is however challenging due to background clutter, occlusions, sensor noise, varying lighting conditions, and object symmetries. Traditional methods have tackled the problem by establishing correspondences between a known 3D model and images [15, 42]. They have generally relied on hand-crafted features and therefore fail when objects are featureless or when cluttered scenes include many occluded objects [18, 36]. Recent methods typically use deep learning and train end-to-end networks to directly regress from input images to 6 degree of freedom (DoF) pose [19, 49]. Nevertheless, each object is treated as a global entity and generalization issues limit their accuracy.

Estimating 6 DoF pose has been extensively addressed in the literature [25, 15, 49, 4]. Recent deep learning-based methods that use CNNs to generate object poses can be generally classified into three categories: keypoint-based [49], viewpoint-based [15], and voting-based methods [37].

Keypoint-based methods detect specified keypoints and apply the Perspective-n-Point (PnP) algorithm for final pose estimation. For example, Hu et al. [18] proposed a segmentation-driven 6 DoF pose estimation method which used the visible parts of objects for local pose prediction from 2D keypoint locations. They then used the output confidence scores of a YOLO-based [41] network to establish 2D to 3D correspondences between the image and the object's 3D model. Zakharov et al. [50] proposed a dense pose object detector to estimate dense 2D-3D correspondence maps between an input image and available 3D models, recovering 6 DoF pose using PnP and RANSAC. In addition to RGB data, extra depth information was used in [14] to detect 3D keypoints of objects via a deep Hough voting network, with the 6 DoF pose parameters then fit with a least-squares method.

Viewpoint-based methods predict 6 DoF poses without textured models. In [33], a generative auto-encoder architecture used a GAN to convert RGB images into 3D coordinates, similar to the image-to-image translation task. Generated pixel-wise predictions were used in multiple stages to form 2D-3D correspondences to estimate poses with RANSAC-based PnP. Manhardt et al. [26] proposed predicting several 6 DoF poses for each object instance to estimate the pose distribution generated by symmetries and repetitive textures. Each predicted hypothesis corresponded to a single 3D translation and rotation, and estimated hypotheses collapsed onto the same valid pose when the object appearance was unique. Other recent variations of this method include Trabelsi et al. [45], who used a multi-task CNN-based encoder/multi-decoder network, and Wang et al. [48] and [20, 34, 43], who used a rendering method by a self-supervised model on unannotated real RGB-D data to find a visually and geometrically optimal alignment.

Voting-based methods have a long history in pose estimation. Before the use of artificial intelligence became widespread, first the Hough Transform [7] and RANSAC [10] and subsequently methods such as pose clustering [31] and geometric hashing [21] were widely used to localize both simple geometric shapes and full 6 DoF object pose. Hough Forests [11], while learning-based, still required hand-crafted feature descriptors. Voting was also extended to 3D point cloud images, such as 4PCS [2] and its variations [29, 28], which used RANSAC-style congruent extraction to estimate affine-invariant poses.

Following the advent of CNNs, hybrid methods have emerged which combined aspects of both CNN and classical voting-based approaches. Both [18] and [36] conclude with RANSAC-based keypoint voting, whereas Deep Hough Voting [37] proposed a complete MLP pipeline of keypoint localization using a series of convolutional layers as the voting module.

A number of different hybrid keypoint localization schemes have been developed that combine deep learning and voting to estimate keypoint positions [36, 49, 18, 37]. At training, these schemes regress a distinct quantity that relates positions of pixels to keypoints. At inference, this quantity is estimated for each pixel, and is cast into an accumulator space in a voting process. Accumulator spaces can be 2D [49, 18, 37] representing image space, or more recently 3D [36] representing the camera reference frame. Following voting, peaks in accumulator space indicate the positions of the keypoints in the 2D image or 3D camera frame.

SUMMARY

Systems and methods are disclosed that facilitate object pose determination via keypoint detection. A machine learning algorithm is employed to facilitate voting-based estimation of the locations of at least three keypoints. In some example embodiments, the machine learning algorithm is trained, based on reference intensity-depth images of an object, to determine a radial distance between a keypoint and a 3D scene location associated with each pixel. At inference, the algorithm is employed to process an intensity-depth image to determine radial distance estimates for each pixel, and these radial distances are employed to increment an accumulator space, such that a sphere is generated in the accumulator space for each pixel, centered on the 3D scene location, and a keypoint location is determined by a peak in the accumulator space, with multiple keypoints enabling pose determination. The methods are adapted to other imaging modalities, including non-depth images and point cloud datasets.

Accordingly, in a first aspect, there is provided a method of processing an intensity-depth image to determine a pose of an object according to a set of keypoints, each keypoint being defined within a frame of reference of the object, the intensity-depth image comprising image data and depth data, the intensity-depth image having been obtained using an intensity-depth imaging camera, the method comprising, for each keypoint of a plurality of keypoints:

employing a machine learning algorithm to process the image data to determine, for each pixel of a plurality of pixels of the image, a corresponding estimated distance between a keypoint location and a respective 3D scene location, wherein a 3D scene location corresponding to a given pixel is a three-dimensional coordinate, defined in a camera reference frame, determined based on the depth data associated with the given pixel, the machine learning algorithm having been trained based on a set of reference intensity-depth images and corresponding known distances between the keypoint location of the keypoint and the 3D scene locations of the reference intensity-depth images, the reference intensity-depth images having been obtained with the object in a plurality of poses;

for each pixel of the plurality of pixels, incrementing an accumulator space at a plurality of accumulator space locations residing on a sphere centered on the 3D scene location, the sphere having a radius equal to the estimated distance, the accumulator space being a three-dimensional space defined within a frame of reference of the intensity-depth imaging camera;

identifying the keypoint location of the keypoint via detection of a global peak in the accumulator space;

employing the keypoint locations of the plurality of keypoints to determine a pose of the object, the pose comprising at least a three-dimensional position of the object.

In some implementations of the method, the machine learning algorithm comprises at least one neural network. The machine learning algorithm may include a single neural network trained to determine the estimated distances associated with each keypoint of the plurality of keypoints. The machine learning algorithm may include a plurality of neural networks, each neural network being separately trained to determine a respective estimated distance associated with at least one keypoint.

In some implementations of the method, a separate accumulator space is incremented for each keypoint.

In some implementations of the method, a common accumulator space is incremented for all keypoints.

In some implementations of the method, the machine learning algorithm is further configured to perform segmentation of the object from the image data, thereby obtaining segmented image data, and wherein the segmented image data is employed to select and employ a subset of pixels when incrementing the accumulator space.

In some implementations of the method, at least one keypoint resides beyond an external surface of the object.

In some implementations of the method, the keypoints are dispersed beyond a bounding box enclosing the object. At least one keypoint may reside at least two object radii from the object centroid.

In some implementations of the method, the image data is colour image data.

In some implementations of the method, the pose is a six-degree-of-freedom pose.

In another aspect, there is provided a system for processing an intensity-depth image to determine a pose of an object according to a set of keypoints, each keypoint being defined within a frame of reference of the object, the intensity-depth image comprising image data and depth data, the system comprising:

an intensity-depth imaging camera; and control and processing circuitry operably coupled to said intensity-depth imaging camera, said control and processing circuitry comprising at least one processor and memory, said memory comprising instructions executable by said processor for performing operations comprising:

obtaining the intensity-depth image from said intensity-depth imaging camera;

for each keypoint of a plurality of keypoints:

employing a machine learning algorithm to process the image data to determine, for each pixel of a plurality of pixels of the image, a corresponding estimated distance between a keypoint location and a respective 3D scene location, wherein a 3D scene location corresponding to a given pixel is a three-dimensional coordinate, defined in a camera reference frame, determined based on the depth data associated with the given pixel, the machine learning algorithm having been trained based on a set of reference intensity-depth images and corresponding known distances between the keypoint location of the keypoint and the 3D scene locations of the reference intensity-depth images, the reference intensity-depth images having been obtained with the object in a plurality of poses;

for each pixel of the plurality of pixels, incrementing an accumulator space at a plurality of accumulator space locations residing on a sphere centered on the 3D scene location, the sphere having a radius equal to the estimated distance, the accumulator space being a three-dimensional space defined within a frame of reference of said intensity-depth imaging camera;

identifying the keypoint location of the keypoint via detection of a global peak in the accumulator space;

employing the keypoint locations of the plurality of keypoints to determine a pose of the object, the pose comprising at least a three-dimensional position of the object.

In another aspect, there is provided a method of processing an image to determine a pose of an object according to a set of keypoints, each keypoint being defined within a frame of reference of the object, the method comprising:

for each keypoint of a plurality of keypoints:

employing a machine learning algorithm to process the image to determine, for each pixel of a plurality of pixels of the image, a corresponding estimated distance between a projected keypoint location and a respective pixel location, wherein each pixel location is defined by a respective two-dimensional coordinate locating the pixel within an image plane of an imaging camera employed to obtain the image, and wherein the projected keypoint location is defined by a respective two-dimensional coordinate corresponding to a projection of a three-dimensional location of the keypoint onto the image plane, the machine learning algorithm having been trained based on a set of reference images and corresponding known distances between the projected keypoint location of the keypoint and pixel locations of the reference images, the reference images having been obtained with the object in a plurality of poses;

for each pixel of the plurality of pixels, incrementing an accumulator space at a plurality of accumulator space locations residing along a circle centered on the pixel location, the circle having a radius equal to the estimated distance, the accumulator space being a two-dimensional space defined within the image plane of the imaging camera;

identifying the projected keypoint location of the keypoint via detection of a global peak in the accumulator space; and employing the projected keypoint locations of the plurality of keypoints to determine the pose of the object, the pose comprising at least a three-dimensional position of the object.

In some example implementations of the method, the machine learning algorithm comprises at least one neural network.

The machine learning algorithm may include a single neural network trained to determine the estimated distances associated with each keypoint of the plurality of keypoints.

The machine learning algorithm may include a plurality of neural networks, each neural network being separately trained to determine a respective estimated distance associated with at least one keypoint.

In some example implementations of the method, a separate accumulator space is incremented for each keypoint.

In some example implementations of the method, a common accumulator space is incremented for all keypoints.

In some example implementations of the method, the machine learning algorithm is further configured to perform segmentation of the object from the image, thereby obtaining segmented image data, and wherein the segmented image data is employed to select and employ a subset of pixels when incrementing the accumulator space.

In some example implementations of the method, the keypoints are dispersed beyond a bounding box enclosing the object. At least one keypoint may reside at least two object radii from the object centroid.

In some example implementations of the method, the image data is colour image data.

In some example implementations of the method, the pose is a six-degree-of-freedom pose.

In some example implementations of the method, a Perspective-n-Point algorithm is employed to determine the pose of the object from the projected keypoint locations.

In another aspect, there is provided a system for processing an image to determine a pose of an object according to a set of keypoints, each keypoint being defined within a frame of reference of the object, the system comprising:
  a camera; and
  control and processing circuitry operably coupled to said camera, said control and processing circuitry comprising at least one processor and memory, said memory comprising instructions executable by said processor for performing operations comprising:
  obtaining the image from the camera;
  for each keypoint of a plurality of keypoints:
    employing a machine learning algorithm to process the image to determine, for each pixel of a plurality of pixels of the image, a corresponding estimated distance between a projected keypoint location and a respective pixel location, wherein each pixel location is defined by a respective two-dimensional coordinate locating the pixel within an image plane of said camera employed to obtain the image, and wherein the projected keypoint location is defined by a respective two-dimensional coordinate corresponding to a projection of a three-dimensional location of the keypoint onto the image plane, the machine learning algorithm having been trained based on a set of reference images and corresponding known distances between the projected keypoint location of the keypoint and pixel locations of the reference images, the reference images having been obtained with the object in a plurality of poses;
    for each pixel of the plurality of pixels, incrementing an accumulator space at a plurality of accumulator space locations residing along a circle centered on the pixel location, the circle having a radius equal to the estimated distance, the accumulator space being a two-dimensional space defined within the image plane of said camera;
    identifying the projected keypoint location of the keypoint via detection of a global peak in the accumulator space; and
  employing the projected keypoint locations of the plurality of keypoints to determine the pose of the object, the pose comprising at least a three-dimensional position of the object.

In another aspect, there is provided a method of processing a point cloud to determine a pose of an object according to a set of keypoints, each keypoint being defined within a frame of reference of the object, the point cloud having been obtained using a 3D depth sensing device, the method comprising:
  for each keypoint of a plurality of keypoints:
    employing a machine learning algorithm to process the point cloud to determine, for each point cloud point of a plurality of point cloud points, a corresponding estimated distance between a keypoint and the point cloud point, the machine learning algorithm having been trained based on a set of reference point clouds and corresponding known distances between the keypoint and the point cloud points of the reference point clouds, the reference point clouds having been obtained with the object in a plurality of poses;
    for each point cloud point, incrementing an accumulator space based on a plurality of accumulator space locations residing on a sphere centered on the point cloud point, the sphere having a radius equal to the estimated distance, the accumulator space being defined within a frame of reference of the 3D depth sensing device;
    identifying a location of the keypoint via detection of a peak within the accumulator space;
  employing the keypoint locations of the plurality of keypoints to determine the pose of the object, the pose comprising at least a three-dimensional position of the object.

In some example implementations of the method, the machine learning algorithm comprises at least one neural network. The machine learning algorithm may include a single neural network trained to determine the estimated distances associated with each keypoint of the plurality of keypoints. The machine learning algorithm may include a plurality of neural networks, each neural network being separately trained to determine a respective estimated distance associated with at least one keypoint.

In some example implementations of the method, a separate accumulator space is incremented for each keypoint.

In some example implementations of the method, a common accumulator space is incremented for all keypoints.

In some example implementations of the method, the keypoints are dispersed beyond a bounding box enclosing the object.

In some example implementations of the method, at least one keypoint resides at least two object radii from the object centroid.

In some example implementations of the method, the pose is a six-degree-of-freedom pose.

In some example implementations of the method, the accumulator space is a continuous accumulator space, and wherein the keypoint location is identified via detection of the peak within the continuous accumulator space.

In some example implementations of the method, the accumulator space is a discrete accumulator space comprising a set of accumulator space points, and wherein the keypoint location is identified via detection of a peak point density within the accumulator space.

In another aspect, there is provided a system for processing of processing a point cloud to determine a pose of an object according to a set of keypoints, each keypoint being defined within a frame of reference of the object, the system comprising:

a 3D depth sensing device; and control and processing circuitry operably coupled to said 3D depth sensing device, said control and processing circuitry comprising at least one processor and memory, said memory comprising instructions executable by said processor for performing operations comprising:

obtaining the point cloud from said 3D depth sensing device;

for each keypoint of a plurality of keypoints:

employing a machine learning algorithm to process the point cloud to determine, for each point cloud point of a plurality of point cloud points, a corresponding estimated distance between a keypoint and the point cloud point, the machine learning algorithm having been trained based on a set of reference point clouds and corresponding known distances between the keypoint and the point cloud points of the reference point clouds, the reference point clouds having been obtained with the object in a plurality of poses;

for each point cloud point, incrementing an accumulator space based on a plurality of accumulator space locations residing on a sphere centered on the point cloud point, the sphere having a radius equal to the estimated distance, the accumulator space being defined within a frame of reference of said 3D depth sensing device;

identifying a location of the keypoint via detection of a peak within the accumulator space;

employing the keypoint locations of the plurality of keypoints to determine the pose of the object, the pose comprising at least a three-dimensional position of the object.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 6A is a table showing the surface keypoint estimation error and standard deviation for 3 voting schemes, with $\bar{r}$ showing the mean distance of keypoints to object centroid.

FIG. 6B is a table showing the dispersed keypoint estimation error and standard deviation for 3 voting schemes, with $\bar{r}$ showing the mean distance of keypoints to object centroid.

FIG. 9 is a table showing LINEMOD and Occlusion LINEMOD accuracy results.

FIG. 11 is a table showing YCB-Video accuracy results.

FIG. 12 is a table showing the impact of accumulator space resolution on accuracy, ADD [%], processing speed [fps], and memory [Mbyte], for LINEMOD ape test images. The processing speed includes only the accumulator space time performance.

FIG. 13 is a table showing accuracy with respect to the number of keypoints.

FIG. 15 is a table comparing the ResNet Backbone structure to PVNet.

FIG. 16 is a table presenting LINEMOD accuracy results: non-symmetric objects are evaluated with ADD, and symmetric objects (annotated with *) are evaluated with ADD-s.

FIG. 17 is a table presenting occlusion LINEMOD accuracy results: non-symmetric objects are evaluated with ADD, and symmetric objects (annotated with *) are evaluated with ADD-s.

FIG. 18 is a table showing YCB Video AUC [49] and ADD(s) [15] results. Non-symmetric objects are evaluated with ADD, and symmetric objects (annotated with *) are evaluated with ADD-s. The AUC metrics is based on the curve with ADD for non-symmetries and ADDs with symmetries.

FIG. 21 is a table showing combined accumulator space mean and standard deviation for different combination of 3 voting schemes, with $\bar{r}$=mean distance of keypoints to object centroid.

DETAILED DESCRIPTION

Figure 1:
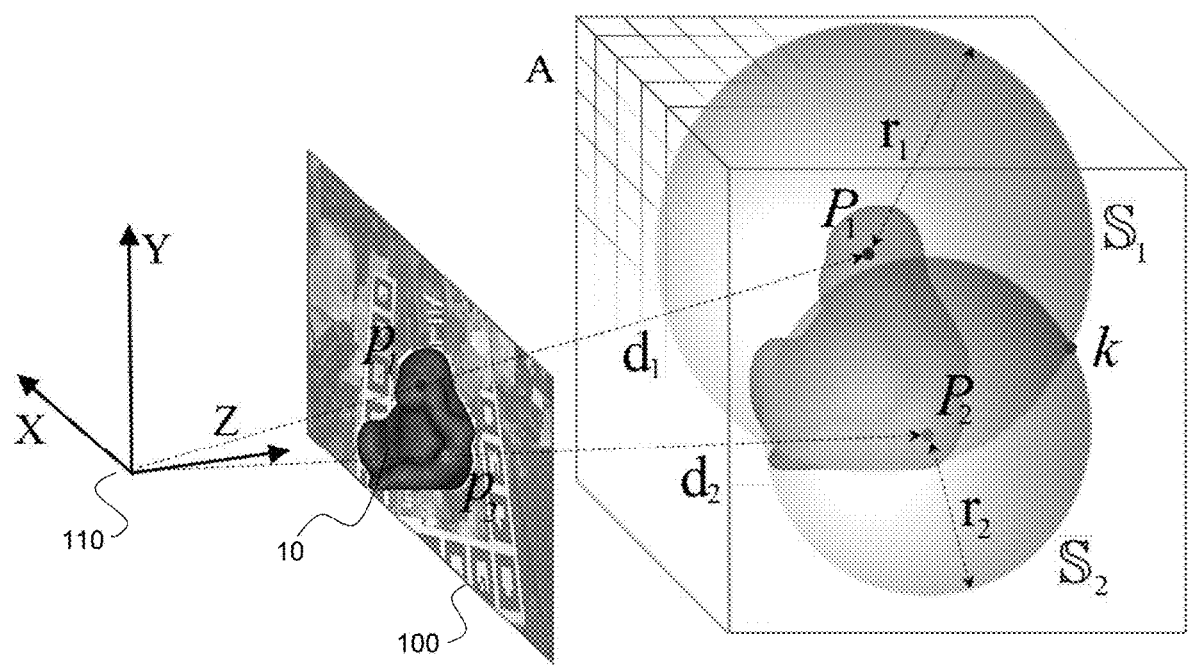
FIG. 1 illustrates the generation of an accumulator space for keypoint detection using an intensity-depth camera.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As noted above, various hybrid deep-learning-based pose detection methods have been developed that employ voting for keypoints in alternative to directly regressing keypoint coordinates. These hybrid schemes regress a directional quantity that relates positions of 2D pixels to 3D keypoints, and this quantity is estimated for each pixel and cast into an accumulator space. As the votes accumulate independently for each pixel, these methods perform especially well in occluded scenes where other techniques tend to degrade.

While such hybrid voting-based keypoint localization methods have demonstrated good performance, the schemes upon which they are based require the regression of either a two-channel (for RGB data) [36] or 3 channel (for RGB-D data) [14] activation map. As a result, the estimation errors in each channel tend to compound, leading to reduced localization accuracy when voting for keypoints.

The present inventors sought to address this problem with conventional hybrid voting-based deep learning keypoint localization methods. In particular, as will be explained in detail below, it was discovered that the aforementioned keypoint estimation errors could be reduced by the use of a one-dimensional measure of radial keypoint displacement when populating the accumulator space for subsequent voting and keypoint localization. Experiments performed by the inventors have shown that such methods can achieve higher keypoint localization accuracy than conventional methods. Furthermore, the present example hybrid methods that employ radial voting have been found to facilitate the dispersion of the keypoint set farther from the object, which in turn has been found to further increase the accuracy of 6 DoF pose estimation of the object.

While the present radial-voting-based hybrid keypoint localization methods may be implemented according to many different embodiments, several of which are disclosed herein, the present disclosure initially focuses on an example implementation that employs image data and depth data obtained from an intensity-depth camera that provides both image data (a two-dimensional pixel map of image intensity) and depth data (a two-dimensional pixel map of depth values, each depth value being associated with a given pixel). The image data may be monochrome image data or colour image data.

The intensity-depth camera obtains an image of an object as shown in FIG. 1. The image plane of the camera is shown at 100 and shows an intensity map of image data. The image data includes an object 10 and the pose of the object is unknown. A camera frame of reference (e.g. coordinate system) is shown at 110, where the dimension z extends normal to the image plane 100. The figure shows two pixels $p_1$ and $p_2$, which have corresponding depth values $d_1$ and $d_2$. The known properties of the camera (e.g. the intrinsic parameters of focal length, principal point, pixel size, skew, and radial distortion coefficients) enable the determination of 3D scene locations $P_1$ and $P_2$ via projection into real space at corresponding distances $d_1$ and $d_2$. Each pixel thus has a corresponding scene point residing in the three-dimensional frame of reference 110 of the camera, the scene point indicating a depth location of the image data associated with the pixel.

The object is characterized by a set of keypoints (e.g. object frame keypoints), each keypoint having a fixed spatial relationship relative to the object, such that knowledge of at least three keypoints facilitates a determination of a position and/or orientation of the object. A keypoint is thus a location in a coordinate reference frame that is fixed to the object. The keypoint can lie on the surface of the object, in the interior of the object (e.g. at the centroid), or exterior to the surface of the object. A keypoint is defined in the object frame, and its location is therefore transformed with the same rigid transformation as the object itself. When multiple (3 or more) keypoints are localized within a sensor frame, then the pose of the object can be estimated by aligning the object frame keypoints with their corresponding sensor frame locations.

According to the present example embodiment, a machine learning algorithm is employed to facilitate the voting-based estimation of the locations of at least three keypoints, within the frame of reference of the camera, thereby enabling the determination of at least a 3 DoF position or 3 DoF orientation, or 6 DoF position and orientation of the object. The location of each keypoint is estimated using a hybrid voting method involving a machine learning algorithm, such as, but not limited to, a convolutional neural network, to facilitate the population of an accumulator space.

The estimation of the location of a given keypoint may be performed as follows. For each pixel (of at least a subset of the pixels of the image data) of the intensity-depth camera, a machine learning algorithm is employed to determine a corresponding estimated distance between a location of the keypoint and the 3D scene location associated with the pixel.

This distance is a scalar value indicating a sphere of possible locations of the keypoint relative to the 3D scene location associated with the pixel.

For example, in FIG. 1, the machine learning algorithm is employed to determine the distance $r_1$ between the 3D scene location $P_1$ (that corresponds to pixel $p_1$) and the (presently unknown) location of the keypoint. This distance $r_1$ thus defines a sphere, that is, a radius of possible keypoint locations, with the sphere being centered on the 3D scene location $P_1$. Likewise, the machine learning algorithm is employed to determine the radial distance $r_2$ between the 3D scene location $P_2$ (that corresponds to pixel $p_2$) and the (presently unknown) location of the keypoint. This second radial distance $r_2$ thus defines a sphere of possible keypoint locations, with the sphere being centered on the 3D scene location $P_2$. As can be seen in the figure, the intersection of the two spheres defines a circle upon which the keypoint is estimated to lie. Adding one or more additional spheres (corresponding to additional pixels, for which the machine learning algorithm is employed to generate additional radial distance values), enables localization of the keypoint, via the identification of peak overlap.

For example, an accumulator space (e.g. a 3D array of voxels) that corresponds to the physical space shown in FIG. 1 may be incremented based on the radial distances corresponding to a plurality of pixels of the camera, and the location of the keypoint may be estimated according to a voting algorithm that identifies a location of a peak in the accumulator space (i.e. a location of maximal overlap of the spheres).

This example method is now described using a mathematical framework based on FIG. 1. As described above, $p_1$ is a pixel from the intensity-depth image I with 2D image coordinate $(u_i, v_i)$ and corresponding 3D camera frame coordinate $(x_i, y_i, z_i)$. The camera frame coordinate of the $j^{th}$ keypoint of an object located at 6 DoF pose $\theta$ is defined by $k_j^\theta=(x_j, y_j, z_j)$. Each 3D scene point $P_i$ at depth $d_i$ projects to a respective 2D image pixel $p_i$.

The machine learning algorithm estimates the radial distance $r_i$ from $P_i$ for a plurality of pixels $p_i$. For each pixel $p_i$, the radial distance $r_i$ is employed to increment an accumulator space A with a sphere $S_i$ that is centered at $P_i$ with radius $r_i$. In the present example implementation, all accumulator space A voxels on the surface of $S_i$ are incremented. The keypoint k lies at the intersection of $\mathbb{S}_1 \cup \mathbb{S}_2$, and all other $S_i$ residing in the accumulator space.

Figure 2A:
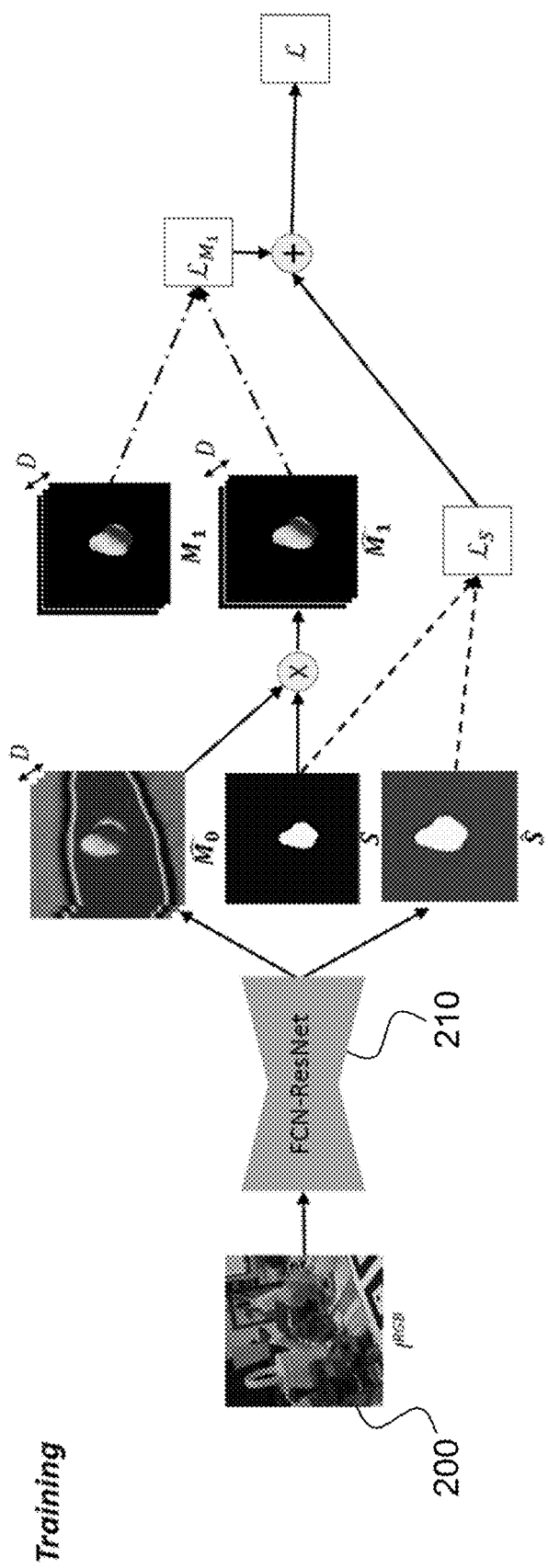
FIG. 2A illustrates an example method of training a full-convolutional neural network for radial-voting-based hybrid keypoint localization.

The machine learning algorithm is trained based on a set of reference intensity-depth images, as illustrated in FIG. 2A. For example, a machine learning algorithm may be trained to estimate radial distances $r_i$ associated with a given keypoint by providing reference intensity-depth images with the object provided in a plurality of different poses, and providing, for each image, ground truth radial distances $r_i$ between the pixel scene locations and the keypoint.

The machine learning algorithm is thus trained to regress the 1D Euclidean distance $m_r$ between the scene points $P_i=(x_i, y_i, z_i)$ and the keypoint locations $k_j^\theta=(x_j, y_j, z_j)$:

$$m_0=(\Delta x, \Delta y, \Delta z)=(x_i-x_j, y_i-y_j, z_i-z_j). \quad (1)$$

$$m_r=\|m_0\|. \quad (1)$$

Referring to FIG. 2A, the training process is performed by providing a set of reference images. The figure illustrates a non-limiting example case in which the camera is an RGB-D intensity-depth camera, but it will be understood that the method can alternatively be performed using monochrome images, or images rendered in a different colour scheme. In the present example, the reference RGB image data generated by the camera is denoted as $I^{RGB}$ (shown at 200 in FIG. 2A) and the depth image data is denoted as $I^D$, with the full RGB and depth image dataset being referred to as I.

The figure also illustrates a non-limiting example case in which the machine learning algorithm is a convolutional neural network, with the example implementation shown in which the convolutional neural network is the fully convolutional FCN-ResNet network 210. Alternative types of machine learning algorithms are described in detail below.

As shown in the figure, the $I^{RGB}$ of image I is employed to train the neural network 210. Moreover, in the present and non-limiting example implementation, in which the neural network 200 is also employed to perform segmentation of the object, a ground truth binary segmented image S of the foreground object at pose $\theta$ is also provided to facilitating segmentation training. Training of keypoint radial distance determination is facilitated by ground truth values $m_r$, as calculated based on ground truth keypoint coordinates $k_j^\theta$ for each keypoint. In the present example, the ground truth values $m_r$, for each pixel in S, are represented by matrix $M_1$. $M_1$ is calculated for a given $\theta$ and $k_j^\theta$.

The network output is the estimate $\hat{S}$ of S, and the (unsegmented) estimate $\widehat{M}_0$ (250) of $M_1$. During training, the ground truth segmented image S is employed to generate $\hat{M}_1$, the matrix containing the estimated values $m_r$, for each pixel in S, via multiplication of $\widehat{M}_0$ by S. The segmentation mask is used to mask out the background values of the feature mask, leading to a refined estimate of the feature mask $\hat{M}_1$.

Unlike methods that employ vector distance measures, such as a 3D offset or a vector distance, each of which involve a matrix $M_1$ having a depth of 2 or 3, the present example that employs a scalar radial distance for keypoint location estimation involves a matrix $M_1$ having a depth of 1.

Training of the neural network 210 is performed by computing a loss, which, in the present example embodiment that includes object segmentation, is based on both the ground truth segmentation image data S and the ground truth radial distance data $M_1$. The loss may be computed as follows:

$$\mathcal{L} = \mathcal{L}_S + \mathcal{L}_{M_1}, \quad (2)$$

$$\mathcal{L}_S = \frac{1}{N}\sum_{i=1}^{N}|\hat{S}_i - S_i|, \quad (3)$$

$$\mathcal{L}_{M_1} = \frac{\sum_{i=1}^{N}|\hat{M}_{1i} - M_{1i}| \cdot S_i}{\sum_{i=1}^{N} S_i}, \quad (4)$$

with summations over N pixels (e.g. all pixels in the image).

At runtime (i.e. inference), the neural network 210 is forward propagated for an input image, resulting in estimates, for each image pixel, of the radial distances from the 3D scene points to the keypoint. For each pixel, this radial distance, along with the depth field value for each pixel, is employed to increment an accumulator space along the surface of a sphere centered at the 3D scene location associated with the pixel, with a radius equal to the distance. When this is completed for a plurality of pixels (e.g. all pixels), the peak in accumulator space indicates the location of the keypoint.

Figure 2B:
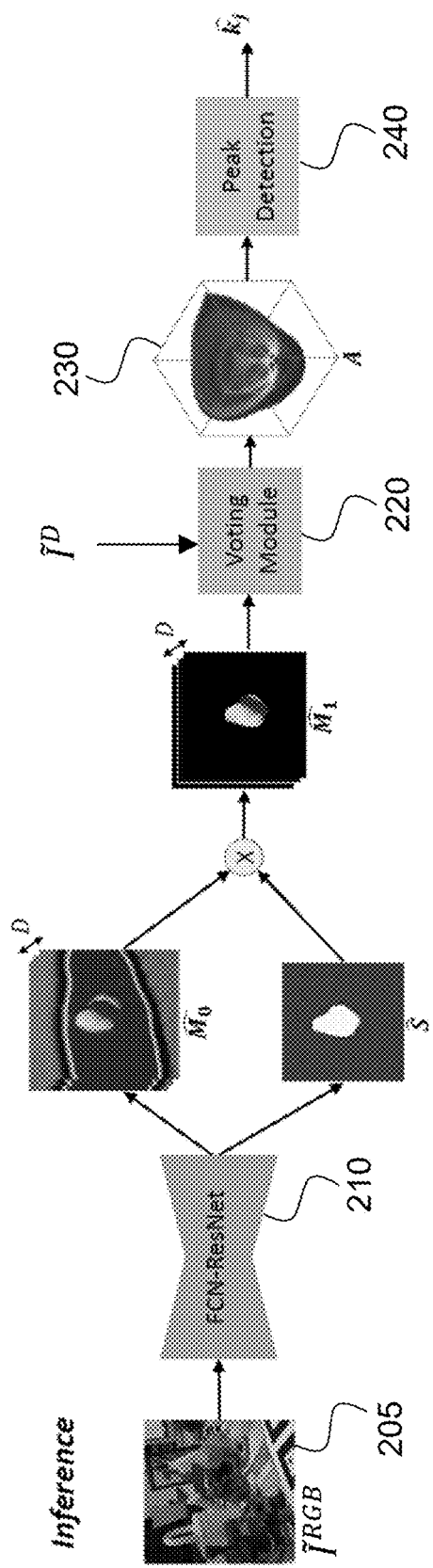
FIG. 2B illustrates an example method of performing inference and keypoint voting using the full-convolutional neural network trained according to the method shown in FIG. 2A.

This method is illustrated in FIG. 2B. RBG image $\tilde{I}^{RGB}$ data associated with an image $\tilde{I}$ of the object with an unknown pose, shown at 205, is provided to the neural network 210, which returns the estimates $\hat{S}$ and $\widehat{M_0}$, the element-wise multiplication of which results in the segmented estimate $\widehat{M_1}$.

The resulting segmented estimate $\widehat{M_1}$ of the per-pixel radial distance values is then employed to perform keypoint voting, as shown at 220. Each $(u_i, v_i)$ element of $\widehat{M_1}$, with corresponding 3D scene coordinate $P_i$ $(x_i, y_i, z_i)$, as generated from the depth field $\tilde{I}^D$ of the image $\tilde{I}$, independently "casts a vote" through the voting module by incrementing the initially 3D accumulator space A. For example, in the present example implementation, each accumulator element (e.g. accumulator space voxel) that intersects with the sphere of radius $\widehat{M_1}[u_i,v_i]$ centered at $(x_i, y_i, z_i)$, is incremented, thereby effectively voting for every element that lies on the surface of a sphere upon which $k_j^\theta$ resides. As explained above, this voting process is illustrated in FIG. 1. At the conclusion of the voting process that is performed by the voting module 220, a global peak will exist at that element of A that contains $k_j^\theta$, as illustrated at 230 in FIG. 2B. A peak detection operation may then be employed to estimate keypoint position $\hat{k}_j^\theta$, as shown at 240 in FIG. 2B.

The above processes are repeated for at least two additional keypoints associated with the object, thereby providing at least three keypoints that enable the determination of the object pose. The present example methods thus provide an efficient means of determining the pose of objects of known geometry and appearance, under rigid rotation, in a possibly cluttered and occluded scene.

It will be understood that while the present example embodiment employs the machine learning algorithm for both the determination of the radial distance and for the segmentation of the object, other example implementations may be absent of segmentation. In this case, the segmentation branches of FIGS. 2A 2B (matrix S and and the segmentation loss function $\mathcal{L}_S$) are not included in the computation.

While a single neural network is shown in FIGS. 2A and 2B, it will be understood that one or more neural networks, or more generally, machine learning algorithms, may be employed. In one example embodiment, a single machine learning algorithm may be trained, based on reference intensity-depth images and ground truth radial offset data associated with a plurality of keypoints, to process an intensity-depth image and generate, for each pixel, a plurality of radial distance estimates, with one radial estimate being provided for each keypoint of a set of keypoints.

For example, a neural network may be trained based on k keypoints, using a single network structure. In such an implementation, an $\hat{M}_1$ tensor would effectively be generated for each keypoint. For example, when implementing a radial voting algorithm with an image of size W×H, a $\hat{M}_1$ tensor for a single keypoint has dimension W×H×1, while a $\hat{M}_1$ tensor associated with k keypoints could have dimensions W×H×k, with a separate channel for each of the k keypoints. The loss function that is optimized during training could simultaneously consider all k keypoints. Furthermore, k separate accumulator spaces could be constructed, or the accumulator space could also have a separate channel to indicate which keypoint is being considered. It is also possible to vote for all k keypoints in a single channel accumulator space. Such an implementation may be beneficial in that network size is smaller, as the intermediate weights are shared. Furthermore, the learning of multiple keypoints tends to result in a more accurate model, as the keypoints reinforce each other during training. Moreover, inference is faster, as there is only one network to traverse.

In another example embodiment, a plurality of machine learning algorithms may be trained, based on reference intensity-depth images and ground truth radial offset data associated with a plurality of keypoints, such that each machine learning algorithm is capable of processing an intensity-depth image to generate, for each pixel, at least one radial distance estimate. For example, each machine learning algorithm may be configured to generate, for each pixel, a radial distance estimate corresponding to a given keypoint, such that each machine learning algorithm is associated with a different keypoint (i.e. trained according to ground truth data associated with a different keypoint). In another example implementation, at least one machine learning algorithm of a set of machine learning algorithms may be configured to generate, for each pixel, a plurality of radial distance estimates, each radial distance estimate corresponding to a different keypoint.

The present example embodiment may be contrasted with known methods in which directional quantities are employed to perform keypoint voting in an accumulator space. For example, in an offset voting implementation, the three-dimensional quantity $m_0$ is regressed, providing a directional displacement regarding between the 3D scene location $P_i$ and the keypoint location $k_j^\theta$, and the accumulator element $A[x_i + \widehat{M_1}[u_i, v_i, 0], u_i + \widehat{M_1}[u_i, v_i], z_i + \widehat{M_1}[u_i, v_i, 2]]$ is incremented, thereby voting for the element containing keypoint $k_j^\theta$. Likewise, in a vector implementation, the unit vector quantity $$m_v = (dx, dy, dz) = \frac{m_0}{\|m_0\|}$$

pointing from the 3D scene location $P_i$ to the keypoint $k_j^\theta$ from $p_i$ is regressed, and the accumulator element is incremented that intersects with the ray $\alpha(x_i + \widehat{M_1}[u_i, v_i, 0], y_i + \widehat{M_1}[u_i, v_i, 1], z_i + \widehat{M_1}[u_i, v_i, 2])$, for $\alpha > 0$, thereby voting for every element on the ray that intersects with $(x_i, y_i, z_i)$ and $k_j^\theta$.

Both the offset $m_0$ and the unit vector $m_v$ measures are directional quantities, which, at face value, would appear to provide more information that the scalar radial distance that is computed and employed for voting according to the present example embodiment. However, it has been found by the present inventors that the present radial-distance-based approach to keypoint localization is more accurate than both the offset and vector schemes. Indeed, while the offset and vector hybrid voting-based keypoint localization methods have demonstrated good performance, the need to perform regression on multi-channel RGB data, the estimation errors in each channel have observed to compound, leading to reduced localization accuracy when employed in voting for keypoints.

As shown below, experiments have demonstrated that implementations of the present radial-voting-based hybrid keypoint localization methods are accurate and competitive, achieving state-of-the-art results on LINEMOD (99.7%), YCB-Video (97.2%) datasets, and notably scoring +7.9% higher than previous methods on the challenging Occlusion LINEMOD (71.1%) dataset. Moreover, it has been found that present radial-distance-based approach to keypoint localization allows for a smaller set of more spatially dispersed keypoints, and that it can be advantageous to disperse keypoints beyond the object surface in order to reduce pose estimation error.

The improved accuracy of the present hybrid radial voting methods is likely due to the fact that the radial scheme regresses a 1D quantity, whereas the offset and vector schemes regress 2D or 3D quantities, with the errors in each independent dimension compounding during voting. Radial voting also has a degree of resilience to in-plane rotations, which is lacking in offset or vector voting. The larger inaccuracies of vector voting likely draw from the fact that small angular errors result in larger positional errors when projected over a distance.

In another example embodiment, the present radial-voting-based hybrid keypoint localization methods may be adapted to perform keypoint localization based on intensity image data alone, in the absence of depth data. Such methods may therefore be implemented using a camera that only provides intensity image data.

Figure 3:
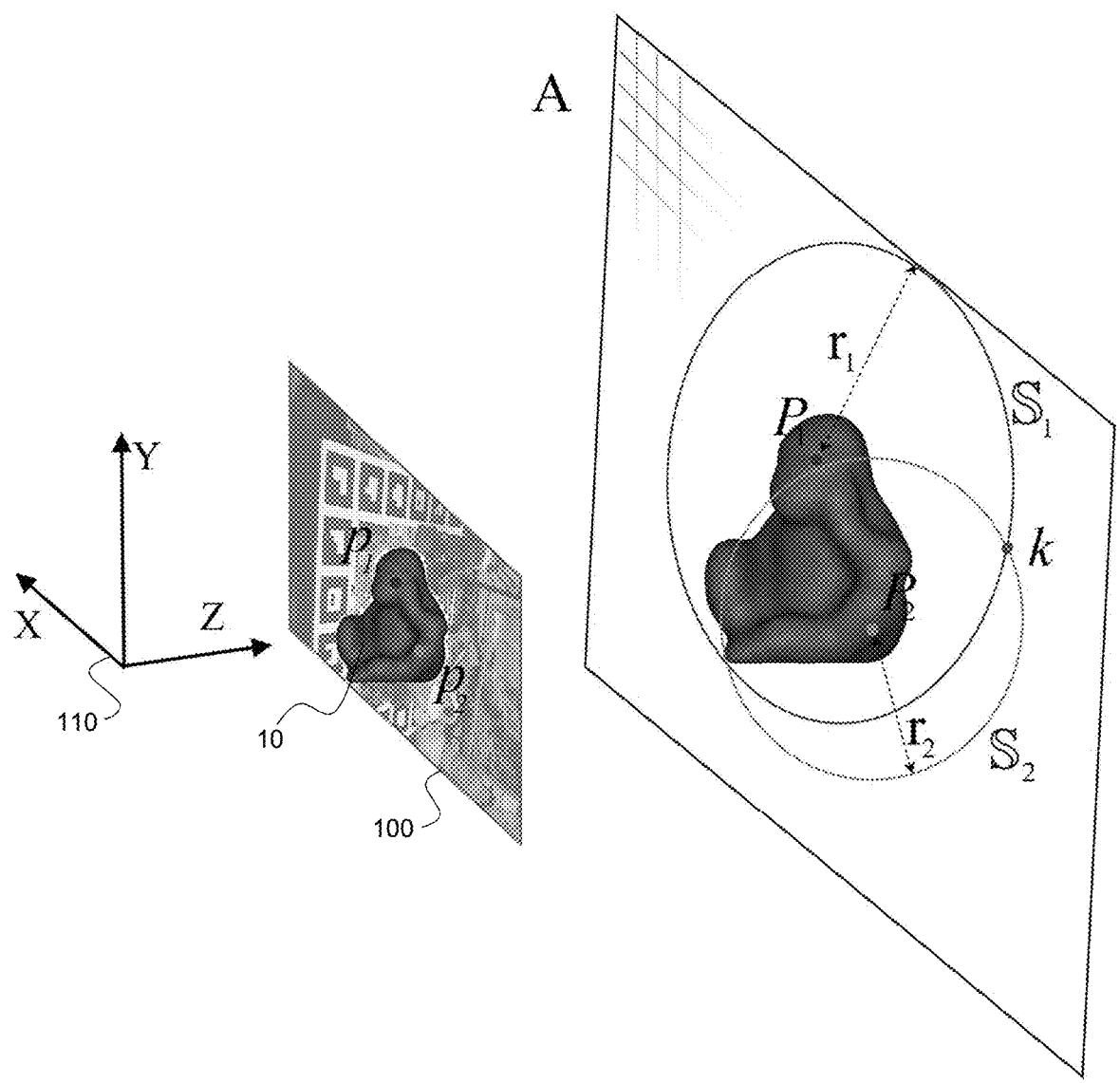
FIG. 3 illustrates the generation of an accumulator space for keypoint detection using an imaging camera.

According to such an embodiment, the estimation of the location of a given keypoint may be performed as follows. For each pixel (of at least a subset of the pixels of the image data) of the camera, a machine learning algorithm is employed to determine a corresponding estimated radial distance between a projected keypoint location and a respective pixel location. As shown in FIG. 3, the projected keypoint location is defined by a respective two-dimensional coordinate corresponding to a projection of a three-dimensional location of the keypoint onto the image plane of the camera. As in FIG. 1, the image plane of the camera is shown at 100 and shows an intensity map of image data. The image data includes an object 10 and the pose of the object is unknown. A camera frame of reference (e.g. coordinate system) is shown at 110 and two pixels are shown at $p_1$ and $p_2$. Furthermore, in the present example embodiment, the radial distance that is determined by the machine learning algorithm is a scalar value that indicates the estimated distance between the projected keypoint location and the pixel location, that is, a radial distance that is indicative of a circle of possible projected keypoint locations within the image plane of the camera.

The machine learning algorithm is trained, according to a given keypoint, with a set of reference images and corresponding known distances between the projected keypoint location of the given keypoint and pixel locations of the reference images, the reference images having been obtained with the object in a plurality of poses.

The loss function employed during training may include a term based on the difference between the estimated and ground truth values of the radial distance between the 2D pixel location $p_i=(u_i, v_i)$ and the projected keypoint location $\tilde{k}_j^\Theta$ (the 2D projection of the 3D keypoint location $k_j^\Theta=(x_j, y_j, z_j)$ of the kth keypoint into the imaging plane of the camera), summed over pixels.

At runtime (i.e. inference), the machine learning algorithm is forward propagated for an input image, resulting in estimates, for each image pixel, of the radial distances from the 2D pixel locations to the projected keypoint. These radial distances comprise the feature map, and are still one-dimensional values (i.e. D=1), as in the preceding example embodiment involving the use of an intensity-depth imaging camera. For each pixel, this radial distance is employed to increment an accumulator space along the perimeter of a circle centered at the 2D pixel location, with a radius equal to the estimated distance.

The accumulator space A is a two-dimensional array of pixels of the same size and resolution as the original input image. After populating the accumulator space, the resulting peak in the accumulator space represents the projected keypoint location $\tilde{k}_j^\Theta$ (the 2D projection of the 3D keypoint location $k_j^\Theta=(x_j, y_j, z_j)$ of the kth keypoint) into the imaging plane of the camera.

After having determined the estimated locations of the projection of three or more keypoints, the relationship between the 2D coordinates of the projections of the keypoints and the known ground truth 3D object frame coordinates of their respective corresponding keypoints is used within a Perspective-n-Point (PnP) framework to recover the object pose.

The machine learning algorithm of the present example embodiment (involving image data that is absent of depth data) may be trained to perform segmentation in addition to generating the radial distances. For example, in one example implementation, the network structure shown in FIGS. 2A and 2B may be employed for training and inference, with the exception that in unlike FIG. 2B, the accumulator space A is a two-dimensional space and is generated in the absence of depth data, as described above.

In another example embodiment, the present radial-voting-based hybrid keypoint localization methods may be adapted to perform keypoint localization based on point cloud data, for example, in the absence of image intensity data. Such methods may therefore be implemented using a device that only provides or facilitates the generation of a point cloud, such as a LIDAR (Light Detection and Ranging) scanner, photogrammetry device or structed light device.

When the image data is a 3D point cloud, the row-column ordering that is exploited in convolutional neural networks does not exist. Indeed, there is an absence of intrinsic ordering of a 3D point cloud, the 3D points of which can be permuted randomly, without impacting the correctness or quality of the data itself. There are many known methods that can apply neural networks to 3D point clouds to explicitly provide a mechanism that compensates for the lack of ordering of point cloud data, examples of which are provided below.

Figure 4:
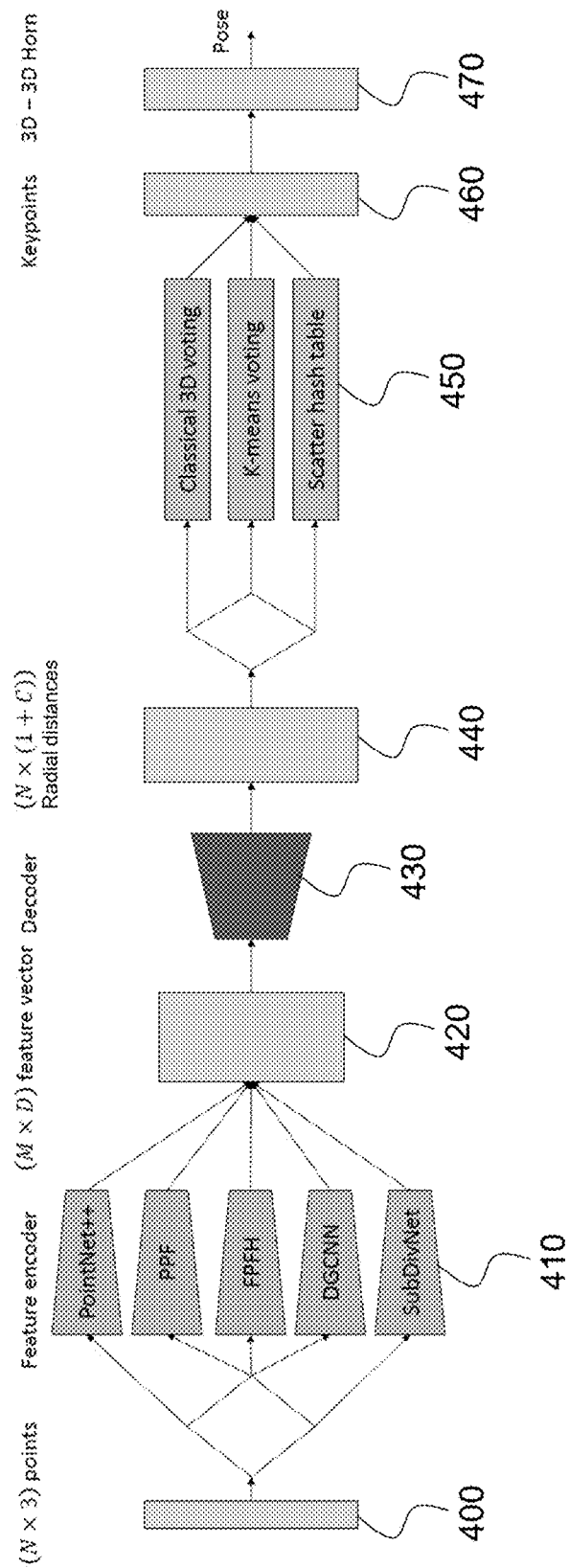
FIG. 4 illustrates an example neural network for performing radial-voting-based hybrid keypoint localization using a point cloud.

FIG. 4 illustrates an example implementation of a suitable neural network structure for processing point cloud data to determine, for each point cloud point of a set of point cloud points associated with a point cloud, a corresponding radial distance between the location of the point cloud point and a keypoint location. The input data provided to the network is a point cloud consisting of a set of N×3D points, which are fed into one or more feature encoders, shown at 410. Non-limiting examples of suitable feature encoders include PointNet++, PPF, PPF, DGCNN and SubDivNet, as shown in the figure. The output of the feature encoder stage 410 is a latent space, that is, an (M×D) feature vector (in some non-limiting examples, D=32, 64, 128 or more, depending on the feature encoder). Passing the feature vector through a decoder 430 yields a set of C radial distances associated with each of the N input points, one for each of the C keypoints, as shown at 440.

The machine learning algorithm is trained, according to a given keypoint, according to a set of reference point clouds and corresponding known distances between the point cloud locations of the point clouds in the reference images and the keypoint locations, the reference images having been obtained with the object in a plurality of poses.

The loss function employed during training may include a term based on the difference between the estimated and ground truth values of the radial distance between the point cloud point and the keypoint location $k_j^\Theta$ of the kth keypoint, summed over point cloud points. The network may be trained to generate, on a per point basis, radial distance estimates for a set of keypoints, rather than employing a separate network for each keypoint.

At runtime (i.e. inference), the machine learning algorithm is forward propagated for an input point cloud, resulting in estimates, for each point cloud point, of the radial distances from the point cloud point to the keypoint. These radial distances comprise the feature map, and are one-dimensional values (i.e. D=1), as in the preceding example embodiments.

For each point cloud point, this radial distance is employed to increment an accumulator space, according to a sphere centered at the point cloud point, with a radius equal to the estimated distance. It will be understood that the accumulator space may be generated and incremented according to a wide variety of different methods, for example, as shown at 450 in FIG. 4. For example, in the case of classical 3D voting, voxels of a physical 3D accumulator space may be incremented, as in the preceding example embodiment that employed both depth and image data from an intensity-depth camera. In another example implementations, methods such as, but not limited to, K-means voting and scatter hash table, may be employed in the alternative. Such alternative methods may not explicitly represent a discrete 3D accumulator space, but rather accumulate votes in continuous space, as point sets. Such alternative methods may trade off decreased time performance for increased space efficiency, which can be important in certain cases where the dimension of the workspace is large or unknown.

Keypoint identification is performed by identifying a peak (e.g. a peak density) in the accumulator space. Having identified the keypoints at step 460, the object pose (e.g. 3 DoF position, 3 DoF orientation, or 6 DoF position and orientation) may be determined as shown at p. 470.

Conventional methods of keypoint selection employ either the corners of the object's bounding box or a strategy known as "Farthest Point Sampling", which attempts to randomly select a small number of keypoints that lie on the object's surface, and which are maximally separated with respect to each other. One common element of these two conventional keypoint selection methods is that they attempt to select keypoints which are on, or close to, the object surface. This common element is based on the commonly held belief that selecting keypoints close to the object surface will lead to more accurate results.

The present inventors experimented with the selection of keypoints that were positioned farther from the object surface, which are henceforth referred to as disperse keypoints. As shown below, it was experimentally demonstrated that dispersing the keypoints farther from the object surface reduced the accuracy of keypoint estimation significantly for conventional, for the directionally-based offset and vector voting schemes, but only slightly reduced keypoint estimation accuracy for the present radial-voting-based hybrid keypoint localization methods. Furthermore, the present inventors also demonstrated that keypoints dispersed beyond the object surface reduced the rotational component of pose estimation error. Moreover, combining these two effects, it was experimentally demonstrated that the increased error in keypoint estimation accuracy was more than offset by the decrease in error in pose estimation accuracy, up to a dispersion of about 2 object radius values.

Accordingly, in some example implementations of the present radial-voting-based hybrid keypoint localization methods, at least one keypoint is selected to lie beyond the surface of the object. In some example embodiments, all keypoints are selected to lie beyond the surface of the object, and further from the object centroid than the corners of the object bounding box. In some example embodiments, the keypoints may reside at least two object radii from the object centroid.

Although many of the example embodiments disclosed herein employ convolutional neural networks, it will be understood that the present example embodiments, and variations thereof, may be adapted to employ alternative machine learning algorithms. Non-limiting examples of alternatives include Transformers (which are variations of CNNs) and Normalizing Flow (which do not necessarily involve CNNs). Examples of non-neural-network machine learning algorithms that may be employed include Support Vector Machines and Random Forests.

Figure 5:
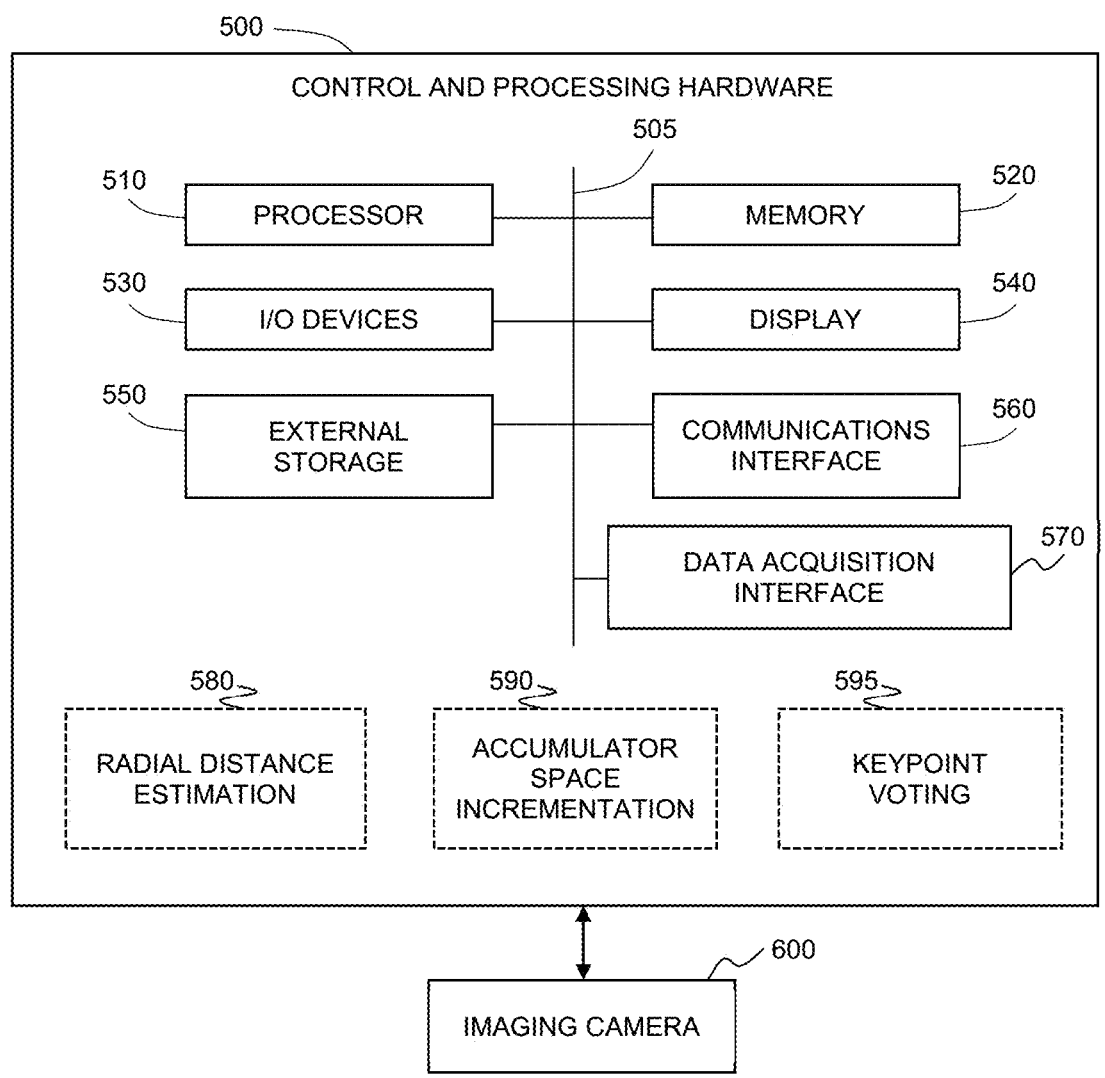
FIG. 5 is an example system for performing radial-voting-based hybrid keypoint localization.

Referring now to FIG. 5, an example system is illustrated for performing radial-voting-based hybrid keypoint localization. Control and processing hardware 500 is employed to process images received from a camera 600, such as a mono camera, and RGB camera, optionally with depth imaging and intensity imaging, or, for example, to process point cloud data obtained using a distance/surface scanning device. As shown in FIG. 5, in one embodiment, control and processing hardware 500 may include a processor 510, a memory 520, a system bus 505, one or more input/output devices 530, and a plurality of optional additional devices such as communications interface 560, display 540, external storage 550, and data acquisition interface 570.

The present example methods may be implemented via processor 510 and/or memory 520. As shown in FIG. 5, the process of performing radial-voting-based hybrid keypoint localization may be implemented by the control and processing hardware 500, via executable instructions represented as radial distance estimation module 580. Likewise, the generation and incrementing (indexing) of an accumulator space may be implemented by the control and processing hardware 500 via executable instructions represented as accumulator space incrementation module 590. Furthermore, the voting (e.g. peak detection) may be implemented by the control and processing hardware 500 via executable instructions represented as keypoint voting module 595.

The functionalities described herein can be partially implemented via hardware logic in processor 510 and partially using the instructions stored in memory 520. Some embodiments may be implemented using processor 510 without additional instructions stored in memory 520. Some embodiments are implemented using the instructions stored in memory 520 for execution by one or more general purpose microprocessors. In some example embodiments, customized processors, such as application specific integrated circuits (ASIC) or field programmable gate array (FPGA), may be employed. Thus, the disclosure is not limited to a specific configuration of hardware and/or software.

Referring again to FIG. 5, it is to be understood that the example system shown in the figure is not intended to be limited to the components that may be employed in a given implementation. For example, the system may include one or more additional processors. Furthermore, one or more components of control and processing hardware 500 may be provided as an external component that is interfaced to a processing device.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed herein can be embodied, at least in part, in software. That is, the techniques may be carried out in a computer system or other data processing system in response to its processor, such as a microprocessor, executing sequences of instructions contained in a memory, such as ROM, volatile RAM, nonvolatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

EXAMPLES

The following examples are presented to enable those skilled in the art to understand and to practice embodiments of the present disclosure. They should not be considered as a limitation on the scope of the disclosure, but merely as being illustrative and representative thereof.

Example 1: Methods

An experiment was conducted to evaluate the relative accuracies of the three voting schemes at keypoint localization. Each scheme used the same 15%/85% train/test split of a subset of objects from the LINEMOD dataset. All three schemes used the exact same backbone network and hyperparameters. Specifically, they all used a fully convolutional ResNet-18 [24], batch size 48, initial learning rate 1e-3, and Adam optimizer, with accumulator space resolution of 1 mm. They were all trained with a fixed learning rate reduction schedule, which reduced the rate by a factor of 10 following every 70 epochs, and all trials trained until they fully converged.

The only difference between trials, other than the selective calculation of $\hat{M}_1$ at training to select a particular voting scheme, was a slight variation in the loss functions. For offset and radial voting, the L1 loss was computed according to eqs. 2-4. Alternately, the Smooth L1 equivalents of eqs. 3 and 4 (with $\beta=1$) were used for vector voting, as in PVNet [36] (albeit therein using a 2D accumulator space).

Sets of size K=4 surface keypoints were selected for each object tested, using the Farthest Point Sampling method [9] (FPS). FPS selects K points on the surface of an object which are well separated and is a popular key-point generation strategy [36, 14, 38, 37]. Following training, each keypoint's location $\hat{k}_j^{\theta_i}$ was estimated by propagating each test image $l_i$ through the network, as in FIG. 2B. The error $\epsilon_{i,j}$ for each estimate was determined by its Euclidean distance from its ground truth location, i.e. $\epsilon_{i,j}=\|\hat{k}_j^{\theta_i}-k_j^{\theta_i}\|$. The average of $\epsilon_{i,j}$ for an object over all test images and keypoints was the keypoint estimation error, denoted as $\bar{\epsilon}$.

Each of the three voting schemes was implemented with care, so that they were numerically accurate and equivalent. To test the correctness of voting in isolation, ground truth values of $M_1$ calculated for each object and scheme were passed directly into the voting module, effectively replacing $\hat{M}_1$ with $M_1$ in the inference stage of FIG. 2B. For each voting scheme, the average $\bar{\epsilon}$ for all objects was similar and less than the accumulator space resolution of 1 mm, indicating that the implementations were correct and accurate.

The $\bar{\epsilon}$ values were evaluated for the three voting schemes for the ape, driller and eggbox objects as summarized in FIG. 6A. These three particular objects were chosen as the ape is the smallest, and the driller the largest of the LINEMOD includes a measure of the average distance $\bar{r}$ of the ground truth keypoints to each object centroid. Radial voting is seen to be the most accurate method, with a mean value between 3× and 4.5× more accurate than offset voting, and between 4.4× and 7.7× more accurate than vector voting. Radial voting also has a smaller standard deviation than either other method. Offset voting is more accurate than vector voting, the ordinal relationship between the three schemes remaining consistent across the objects.

This experiment was repeated for keypoints selected from the corners of an object's bounding box, which was first scaled by a factor of 2 so that the keypoints were dispersed to fall outside of the object's surface. The results in FIG. 6B indicate that radial voting still outperforms the other two schemes by a large margin. Further, whereas the other two methods decrease in accuracy significantly as the mean keypoint distance $\bar{r}$ increases, radial voting accuracy degrades more gracefully. For example, for the ape, the 232% increase in $\bar{r}$ from 61.2 to 142.1 mm, reduced accuracy for offset voting by 80% (from 5.8 to 10.4 mm), but only by 23% (from 2.2 to 2.7 mm) for radial voting.

Example 2: Keypoint Dispersion to Improve Pose Accuracy

It was suggested in [14] that the accuracy of 6 DoF pose parameter estimation can be improved by selecting keypoints that lie on the object surface, rather than the corners of bounding boxes which lie beyond the object surface. While this is certainly the case if the localization errors increase significantly with keypoint distance (as with vector and offset voting), there is actually an advantage to dispersing the keypoints farther apart, where such localization error to be eliminated or reduced (as with radial voting).

To demonstrate this advantage, an experiment was executed in which the keypoint locations were dispersed to varying degrees under a constant keypoint estimation error, with the impact measured on the accuracy of the estimated pose. A set $\mathcal{K}=\{k_j\}_{j=1}^4$ of keypoints were selected from the surface of an object, using the FPS strategy. This set was then rigidly transformed by T, comprising a random rotation (within 0° to 360° for each axis) and a random translation (within ½ of the object radius), to form keypoint set $\mathcal{K}_T$. Each key-point in $\mathcal{K}_T$ was then independently perturbed by a magnitude of 1.5 mm in a random direction, to simulate the key-point localization error of the radial voting scheme, resulting in keypoint set $\widetilde{\mathcal{K}}_T$.

Next, the transformation $\widetilde{T}$ between $\widetilde{\mathcal{K}}_T$ and the original (untransformed and unperturbed) keypoint set $\mathcal{K}$ was calculated using the Horn method [17]. This process simulates the pose estimation that would occur between estimated keypoint locations, each of which contains some error, and their corresponding ground truth model keypoints. The surface points of the object were then transformed by both the ground truth T and the estimated $\widetilde{T}$ transformations, and the distances separating corresponding transformed surface points were compared.

The above process was repeated for versions of $\mathcal{K}$ that were dispersed through scaling them an integral factor of the object radius from the object centroid. The exact same error perturbations (i.e. magnitudes and directions) were applied to each distinct keypoint for each new scale value. The scaled trials therefore represented keypoints that were dispersed more distant from the object centroid, albeit with the exact same localization error.

Figure 7:
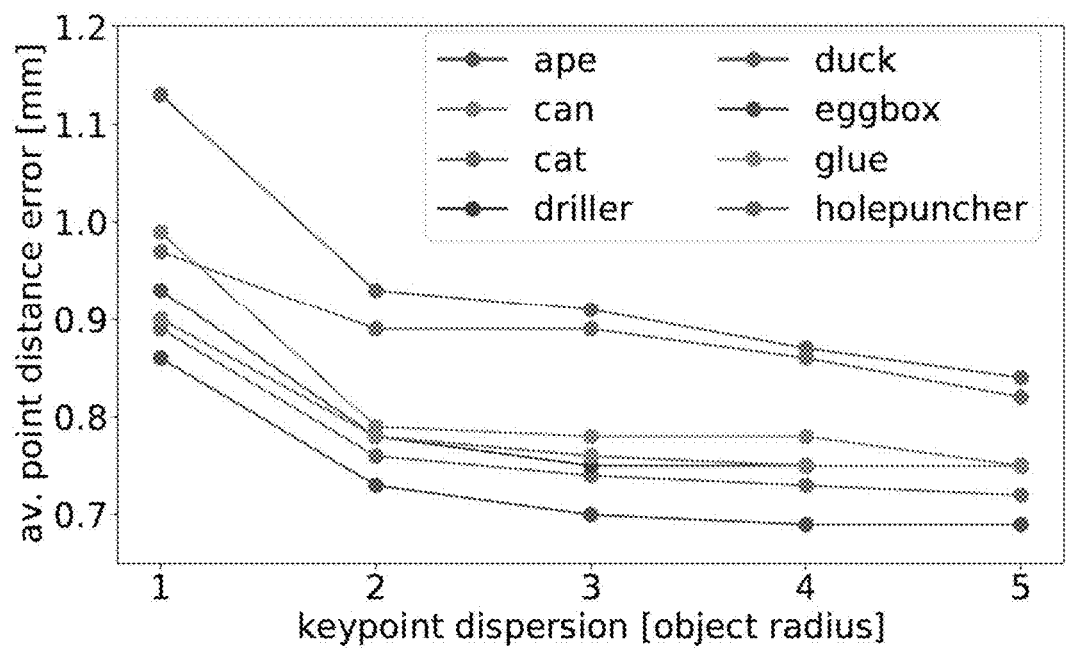
FIG. 7 plots the average point distance error [mm] vs. keypoint dispersion [object radius].

This process was executed for all Occlusion LINEMOD objects, with 100 trials for each scale factor value from 1 to 5. The means of the corresponding point distances (i.e. the ADD metric as defined in [15]) are plotted in FIG. 7. It can be seen that ADD decreases for the first few scale factor increments for all objects, indicating an increase in pose estimation accuracy for larger keypoint dispersions. This increase in accuracy stems from improved rotational estimates, as the same positional perturbation error of a keypoint under a larger moment arm will result in a smaller angular error. The translational component of the transformation is not impacted by the scaling, as the Horn method starts by centering the two point clouds. After a certain increase in scale factor of 3 or 4, the unaffected translational error dominates, and the error plateaus.

This experiment indicates that, so long as keypoint localization error remains small, then 6 DoF pose estimation error is reduced by dispersing the keypoints so that they fall ~1 object radius beyond the surface of the object.

Example 3: Example Implementation of 6 DoF Pose Detection Using Radial Voting

The present radial voting scheme, henceforth referred to as "RCVPose", was employed to perform 6 DoF pose estimation, based on its superior accuracy as demonstrated above. The network of FIGS. 2A and 2B was used with ResNet-152 serving as the FCN-ResNet module.

The minimal K=3 keypoints were used for each object, selected from the corners of each object's bounding box. As per the preceding example, these keypoints were scaled to lie beyond the surface of each object, at a distance of 2 object radius units from its centroid. For each object, 3 instances of the network were trained, one for each keypoint.

Once the K=3 keypoint locations are estimated for an image, it is straightforward to determine the object's 6 DoF rigid transformation θ, by passing the corresponding estimated scene and ground truth object keypoint coordinates to the Horn [17] or an equivalent [8] method. This is analogous to the approach of [14], and differs from previous pure RGB approaches [36] which require the iterative optimization of a PnP method through RANSAC. In contrast, the transformation recovery here and in [14] are non-iterative and therefore efficient.

Prior to training, each RGB image was shifted and scaled to adhere to the ImageNet mean and standard deviation [6]. The 3D coordinates are then calculated from the image depth fields and represented in decimeter units, as all LINEMOD and YCB-Video objects are at most 1.5 decimeters in diameter.

Figure 8:
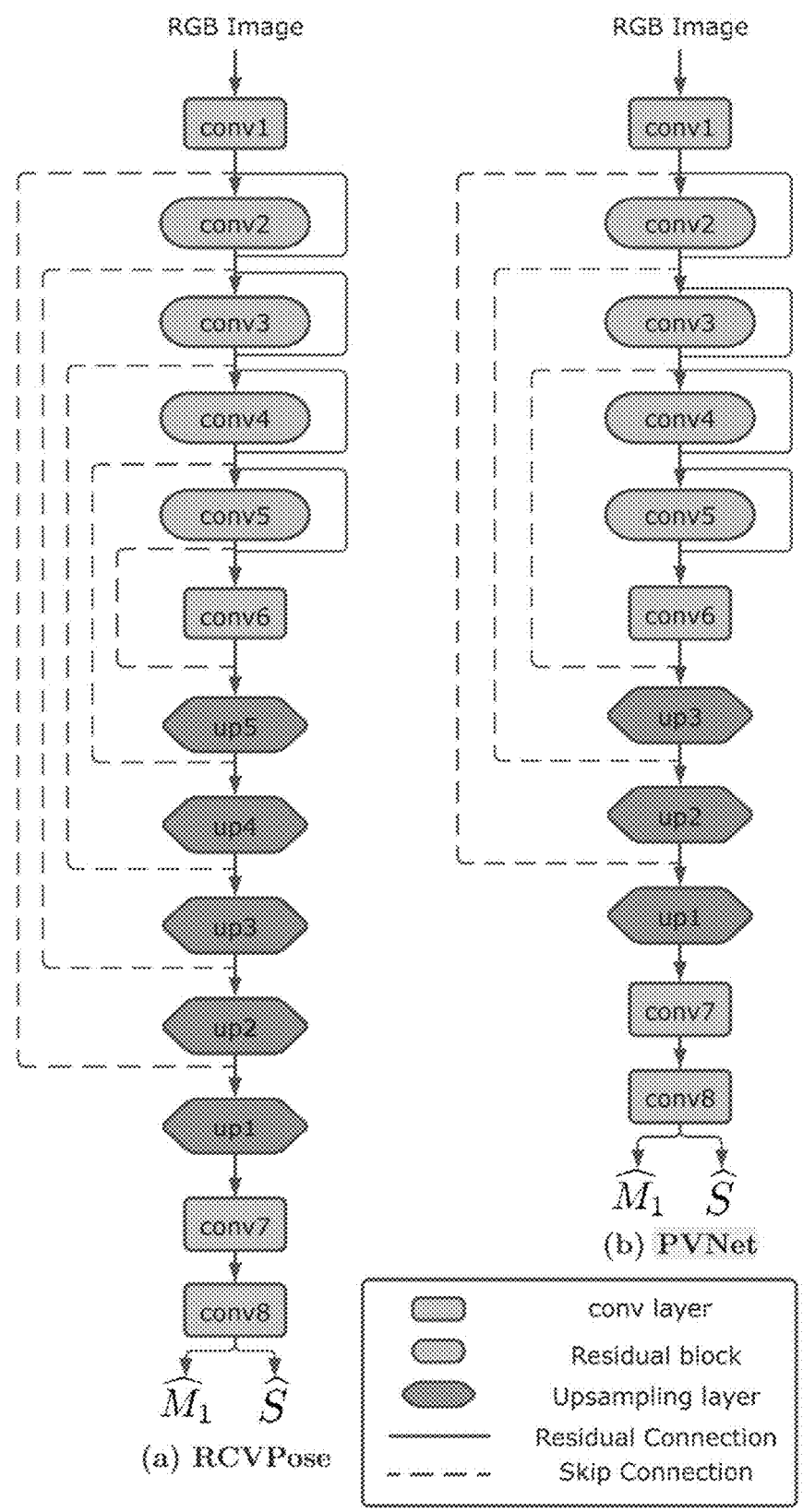
FIG. 8 illustrates the backbone network structure for (a) RCVPose and (b) PVNet. Denser skip connections allow more local image features to be kept during upsampling.
Figure 10A:
FIGS. 10A-10D show Occluded LINEMOD sample results, with the dark grey box showing ground truth and the light grey box showing the estimate. The RCVPose is shown to be robust to occlusion even in some severe cases.
Figure 10B:
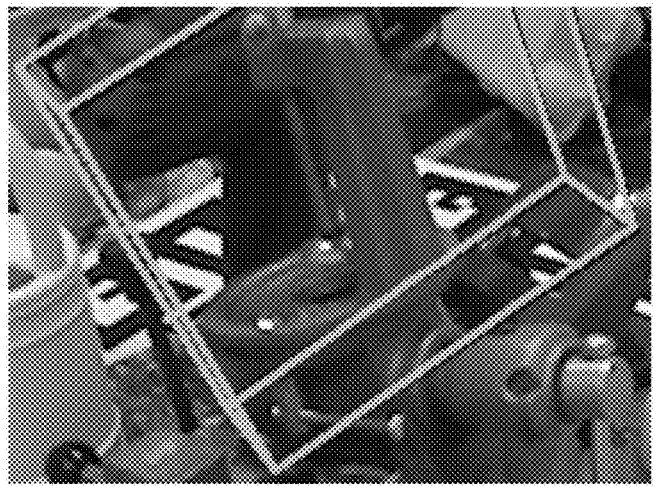
Figure 10C:
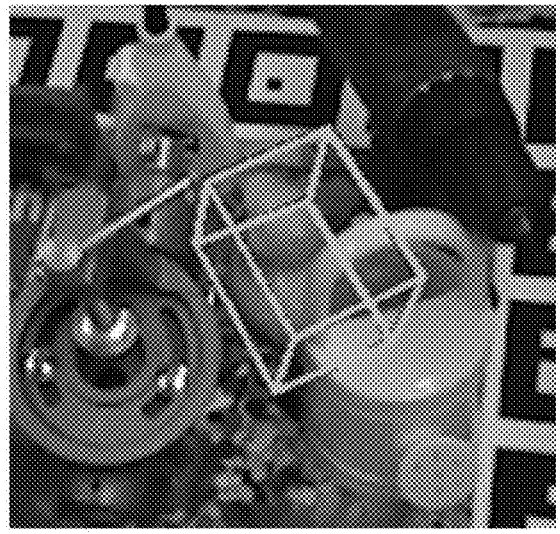
Figure 10D:
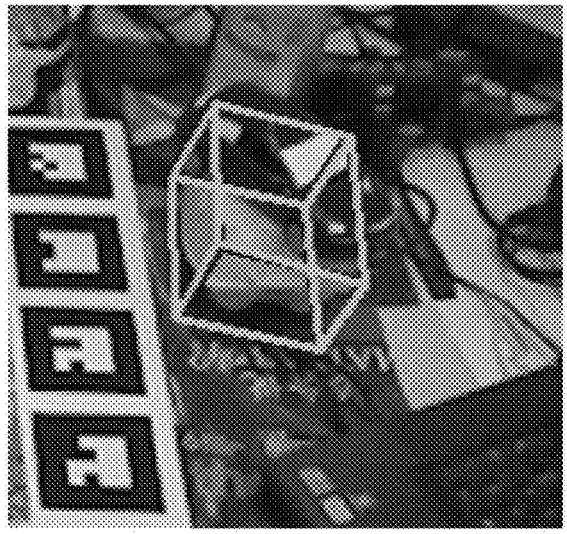

The network structure was based on a Fully Convolutional ResNet-152 [13], similar to PVNet [36], albeit with two main differences. First, LeakyReLU was replaced with ReLU as the activation function. This was because RCVPose only includes positive values, in contrast to the vector voting scheme of PVNet which admits both positive and negative values. The second difference, illustrated in FIG. 8, is that more skip connections were added, linking the downsampling and upsampling layers, to enhance the impact of additional local features when up-sampling [24].

The loss functions of Eqs. 2-4 were used with an Adam optimizer, with an initial learning rate of lr=1e-4. The lr was adjusted on a fixed schedule, re-scaled by a factor of 0.1 every 70 epochs. The network was trained for 300 and 500 epochs for each object in the LINEMOD and YCB-Video datasets respectively, with batch size 32 for all training runs.

The accumulator space A is represented as a flat 3D integer array, i.e. an axis-aligned grid of voxel cubes. The size of A was set for each test image to the bounding box of the 3D data. The voxel resolution was set to 5 mm, which was found to be a good tradeoff between memory expense and keypoint localization accuracy, as described below.

All voxels were initialized to zero, with their values incremented as votes were cast. The voting process is similar to 3D sphere rendering, wherein those voxels that intersect with the sphere surface have their values incremented. The process is based on Andre's circle rendering algorithm [3]. A series of 2D slices were generated of A parallel to the x-y plane, that fall within the sphere radius from the sphere center in both directions of the z-axis. For each slice, the radius of the circle formed by the intersection of the sphere and that slice is calculated, and all voxels that intersect with this circumference are incremented. The algorithm is accurate and efficient, requiring that only a small portion of the voxels be visited for each sphere rendering. It was implemented in Python and parallelized at the thread level, and executes with an efficiency similar to forward network inference.

Example 4: Initial Experiments

The LINEMOD dataset [15] includes 1200 images per object. The training set contained only 180 training samples using the standard 15%/85% training/testing split [49, 36, 5, 14, 18]. The dataset was augmented by rendering the objects with a random rotation and translation, transposed using the BOP rendering kit [16] onto a background image drawn from the MSCOCO dataset [23]. An additional 1300 augmented images were generated for each object in this way, inflating the training set to 1480 images per object.

The LINEMOD depth images have an offset compared to the ground-truth pose values, for unknown reasons [27]. To reduce the impact of this offset, the depth field was regenerated for each training image from the ground truth pose, by reprojecting the depth value drawn from the object pose at each 2D pixel coordinate. The majority (1300) of the resulting training set were in this way purely synthetic images, and the minority (180) comprised real RGB and synthetic depth. All test images were original, real and unaltered.

Occlusion LINEMOD [4] is a re-annotation of LINEMOD comprising a subset of 1215 challenging test images of objects under partial occlusion. The protocol is to train the network on LINEMOD images only, and then test on Occluded LINEMOD to verify robustness.

YCB-Video [49] is a much larger dataset, containing 130K key frames of 21 objects over 92 videos. 113K frames were split for training and 27K frames for testing, following PVN3D [14]. For data augmentation, YCB-Video provides 80K synthetic images with random object poses, rendered on a black background. The process described above was repeated by rendering random MSCOCO images as background. The complete training dataset therefore comprised 113K real+80K synthetic=193K images.

The ADD and ADDs (i.e. ADD(s)) metrics were followed as defined by [15] to evaluate LINEMOD, whereas YCB- Video is evaluated based on ADD(s) and AUC as proposed by [49]. All metrics are based on the distances between corresponding points as objects are transformed by the ground truth and estimated transformations. ADD measures the average distance between corresponding points, whereas ADDs averages the minimum distance between closest points, and is more forgiving for symmetric objects. A pose is considered correct if its ADD(s) falls within 10% of the object radius. AUC applies the ADD(s) values to determine the success of an estimated transformation, integrating these results over a varying 0 to 100 mm threshold.

State-of-art results were achieved on all three datasets under a moderate training effort (i.e. hyper-parameter adjustment). The most challenging dataset was Occlusion LINEMOD, the results for which are listed in FIG. 9. RCVPose+ICP outperformed all other methods on average, achieving 71.1% mean accuracy, exceeding the next closest method PVN3D by 7.9%. It achieved the top performance on all objects except duck, where PVNet had the best result. Even without ICP refinement, the achieved close to the same results at 70.2% mean accuracy.

One advantage of RCVPose is its scale tolerance. Unlike most other methods whose performance reduced with smaller objects, the present method was not impacted much. Significantly, it improved the accuracy over PVN3D from 33.9%, 39.1% to 61.3%, 39.1% for the ape and cat, respectively. Another advantage of the present radial voting method is that it accumulates votes independently for each pixel and is therefore robust to partial occlusions, exhibiting the ability to recognize objects that undergo up to 70% occlusion, as in FIGS. 10A-10D.

The LINEMOD dataset is less challenging, as the labelled objects are non-occluded. As listed in FIG. 9, RCVPose+ICP still achieved the highest mean accuracy of 99.7%, slightly exceeding the tie between RCVPose (without ICP) and PVN3D. RCVPose+ICP was the only method to achieve 100% accuracy for more than one object. Again, the RGB-D methods outperformed all other data modes, and the top performing RGB method that included depth refinement (i.e. RGB+D ref) outperformed the best pure RGB method, supporting the benefits of the depth mode.

The YCB-Video results in FIG. 11 list the AUC and ADD(s) metrics, both with and without depth refinement. RCVPose is the top performing method, achieving between 95.2% and 95.9% ADD(s) and between 96.6% and 97.2% AUC accuracy, outperforming the next best method PVN3D by at least 3.4% ADD(s) and 1.1% AUC. Notably, RCV-Pose increased the ADD(s) accuracy of the relatively small tuna fish can by a full 6%.

Example 5: Ablation Studies

Experiments were performed with different resolutions of the accumulator space, to evaluate the balance of accuracy and efficiency. Resolution p refers to the linear dimension of a voxel edge (i.e. voxel volume=$\rho^3$). Six different resolutions were selected from $\rho$=1 mm to 16 mm, and the voting module was performed for each p value with the same system, for all 3 scaled bounding box keypoints of all test images of the LINEMOD ape object (as in FIG. 6B).

The results are listed in FIG. 12, which shows the means $\mu_r$ and standard deviations $0_r$ of the keypoint estimation errors $\sigma_r$ and ADD metric, and both the time and space efficiencies, for varying voxel resolutions. As expected, the voting module was faster and smaller, and the keypoint estimation error was greater, at coarser resolutions. The ADD value, which is the main metric used to identify a successful pose estimation event, remains nearly constant up to a resolution of 5 mm. The $\rho$=5 mm voxel size therefore achieved both an acceptable speed of 24 fps, an efficient memory footprint of 3.4 Mbytes, and close to the highest ADD value, and so it was subsequently used throughout the experiments.

Previous works have used a minimum of 4 [35] keypoints, and up to 8 [14, 36] or more [37] keypoints per object, selected from the corners of the object bounding box [40, 44, 32] or using the FPS algorithm [37, 14, 36]. It has been suggested that a greater number of keypoints is preferable to improve robustness and accuracy [14, 36], especially for pure RGB methods in which at least 3 key-points need to visible for any view of an object to satisfy the constraints of the P3P algorithm [39, 12].

Experiments were performed to determine the impact of the number of keypoints on pose estimation accuracy. Sets of 3, 4 and 8 keypoints were selected for the ape, driller and egg-box LINEMOD objects, using the Bounding Box selection method described in above. The results shown in FIG. 13 and FIG. 14 indicate that increasing the number of RCV-Pose keypoints does not impact pose estimation accuracy, which changed at most only 0.4% between these settings for all three objects. This is likely due to the accuracy with which the radial voting scheme is able to estimate keypoint locations, which removes the added benefit of redundant keypoints. Given that the time and memory expense scale linearly with the number of keypoints, the minimal 3 keypoints were used for RCVPose for all of the present experiments.

Example 6: Time Performance

RCVPose was executed at 18 fps on a server with an Intel Xeon 2.3 GHz CPU and RTX8000 GPU for a 640×480 image input. This compares well to other voting-based methods, such as PVNet at 25 fps, and PVN3D at 5 fps. The backbone network forward path, the radial voting process and the Horn transformation solver take 10, 41, and 4 msecs. per image respectively at inference time.

Example 7: ResNet Backbone Structure

Figure 15:
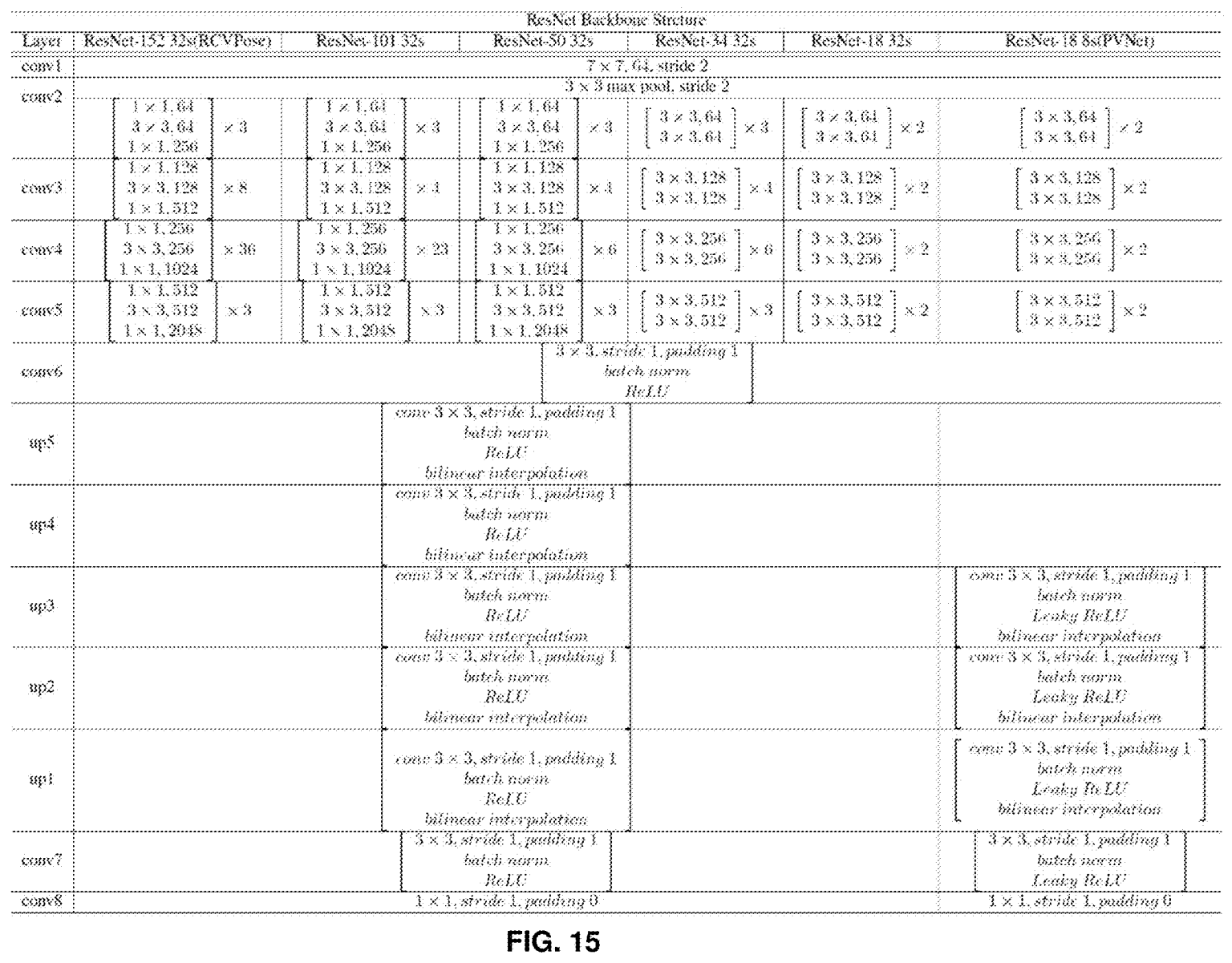

As shown in FIG. 15, ResNet was modified to a Fully Convolutional Network. The Fully Connected Layer was replaced with a convolutional layer for the following up sampling layers. Up-sampling was then applied to the feature map with a combination of convolution, bilinear interpolations, and skip concatenations from the residual blocks. More skip layers were applied than in PVNet [36], under the assumption that the convolutional feature maps would preserve more local features than the alternative bilinear interpolation, especially for deeper small scale feature maps. This design was supported by the ablation study described below.

Example 8: Accuracy Results Per Object

Figure 14:
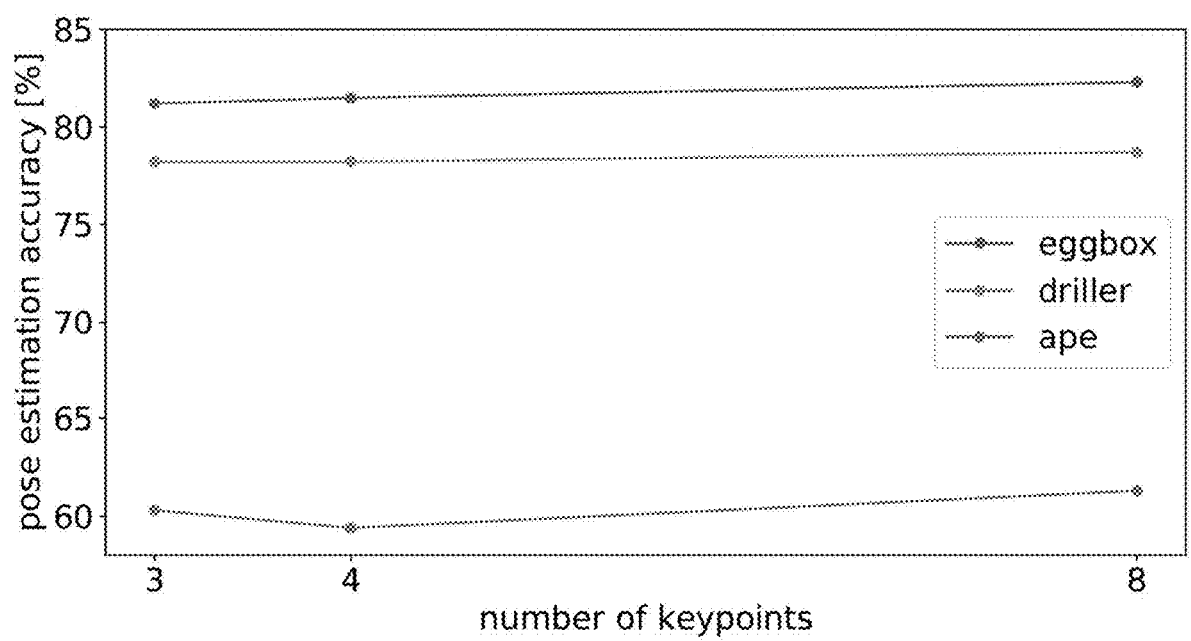
FIG. 14 plots pose estimation accuracy [mm] vs. number of keypoints.
Figure 22:
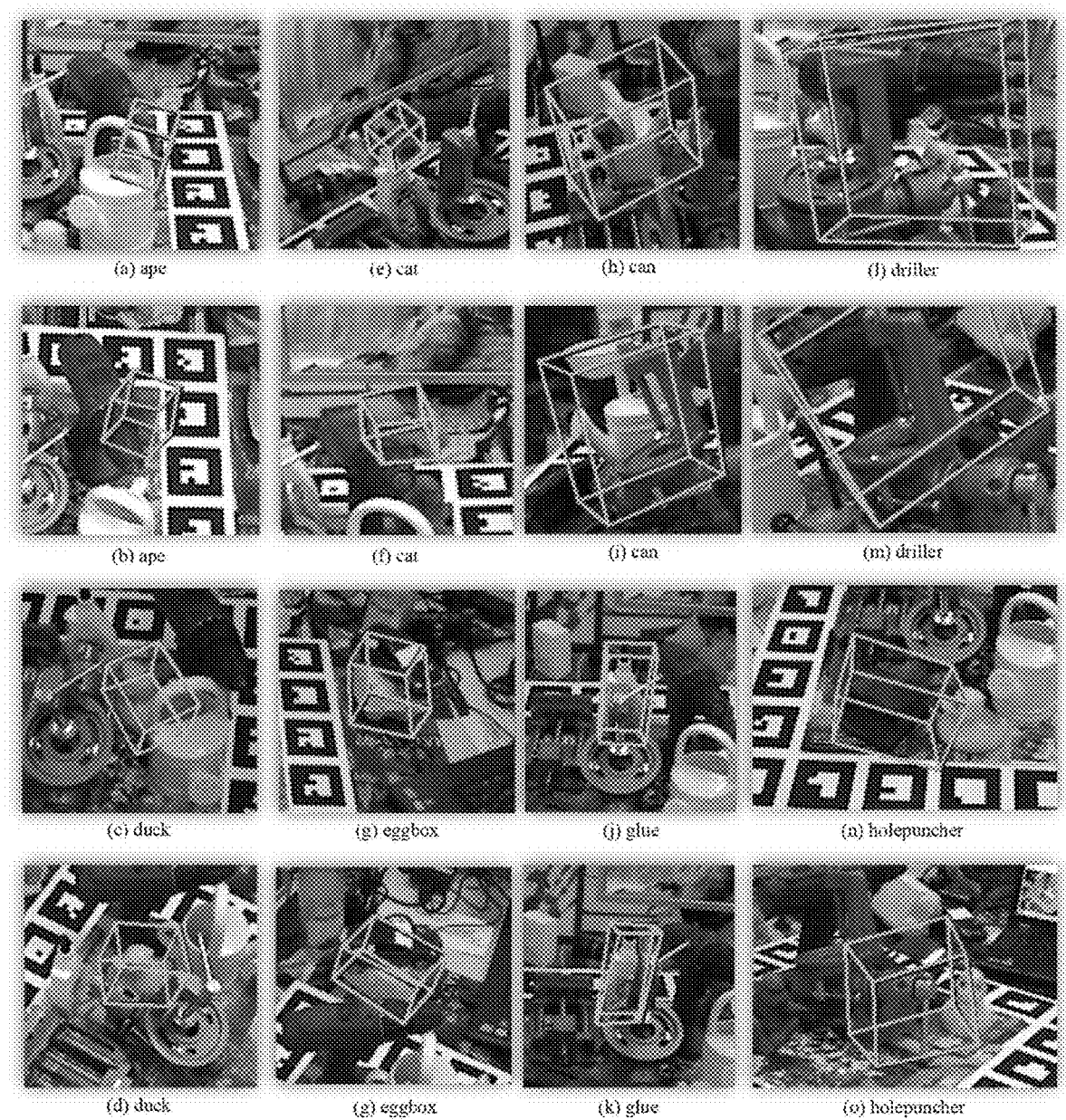
FIG. 22 shows occluded LINEMOD sample results, with the dark grey box showing ground truth and the light grey box showing the estimate.

The detailed LINEMOD, Occlusion LINEMOD ADD(s) results, and the YCB-Video ADD(s) and AUC results categorized per object are listed in FIGS. 12-14, respectively. Some additional successful images showing recovered and ground truth bounding boxes are displayed in FIG. 22.

As can be seen in FIG. 16, the original LINEMOD dataset is mostly saturated, with results from a number of different methods that are close to perfect. Nevertheless, RCVPose+ICP outperformed all alternatives at 99.7%, with 100% ADD(s) for three objects, including the only perfect scores for driller and holepuncher.

The results in FIG. 17 show Occlusion LINEMOD is to be quite challenging. This is not only just because of the occluded scenes, but is also due to the fact that the meshes are not very precisely modelled, and some ground truth poses are not accurate for some cases.

Figure 18:
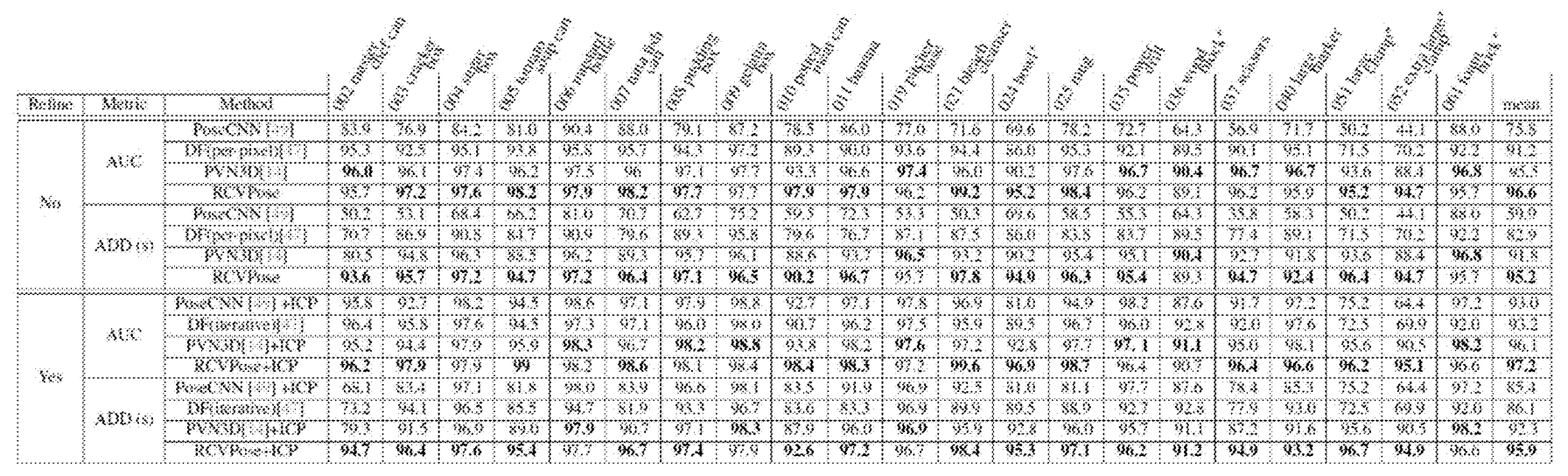

The YCB-Video dataset has two evaluation metrics, as shown in FIG. 18. In general, AUC is more forgiving than ADD(s) since AUC has a tolerance of up to 10 cm [49]. For some objects like the master chef can and the power drill, RCVPose performs slightly worse in AUC compared to PVN3D[14], while still performing better in ADD(s).

Example 9: Additional Ablation Studies

There were five different network architectures proposed in the initial ResNet paper [13]. While some 6 DoF pose recovery works use variations of ResNet-18 [36, 47, 50, 45] others use ResNet-50 [48, 34]. Some customize the structure by converting it to encoder [45, 34, 50, 47], adding extra layers and skip connections [36] while others use the original ResNet unaltered [14, 33].

Figures 19, 20:
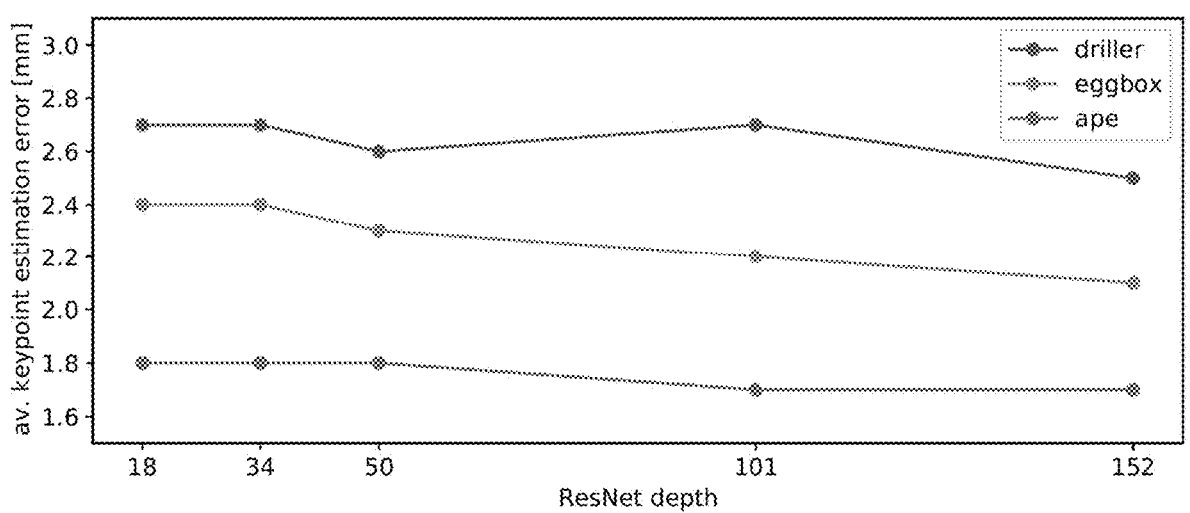
FIG. 19 is a table showing average keypoint estimation error mean and standard deviation for different ResNet-18 backbone skip connections. Increasing the skip connections reduced the error of the estimation.
FIG. 20 plots mean keypoint estimation error vs. ResNet depth.

An experiment was conducted which examined the impact of the number of skip connections on mean keypoint estimation error C. The number of skip connections was increased for ResNet-18, from 3 to 5. Skip connections improve the influence of image features during upsampling. The results are displayed in FIG. 19 and show that increasing the skip connections from 3 to 5, decreased both the mean and the standard deviation of the keypoint estimation error decreased by a large margin, in all cases A further experiment tested different ResNet depths, from 18 to 152 layers. The results are plotted in FIG. 20, and indicate that the substantially deeper networks exhibit only a minor reduction in $\bar{\epsilon}$.

Despite the rather minor improvement due to increased depth, ResNet-152 was nevertheless used with 5 skip connections in the RCVPose in the present experiments. It is likely that very similar results would have been achieved had the backbone network be based on ResNet-18, albeit with a faster training cycle and smaller memory footprint.

The accumulator space is represented exactly the same for all three voting schemes and is handled in exactly the same manner to extract keypoint locations through peak detection, once the voting has been completed. It is therefore possible and straightforward to combine voting schemes, by simply adding their resulting accumulator spaces prior to peak detection.

This was implemented to compare the impact of all possible combinations of offset, vector, and radial voting schemes. The results are shown in FIG. 21, which also includes the results from each individual voting scheme for comparison. It can be seen that the radial voting scheme outperforms all other alternatives, yielding a lower mean and standard deviation of keypoint estimation error C.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

REFERENCES

[1] NA

[2] D. Aiger, N. J. Mitra, and D. Cohen-Or. 4-points congruent sets for robust surface registration. *ACM Transactions on Graphics*, 27(3): #85, 1-10, 2008.

[3] Eric Andres. Discrete circles, rings and spheres. *Computers & Graphics*, 18(5):695-706, 1994.

[4] Eric Brachmann, Alexander Krull, Frank Michel, Stefan Gumhold, Jamie Shotton, and Carsten Rother. Learning 6d object pose estimation using 3d object coordinates. In *European conference on computer vision*, pages 536-551. Springer, 2014.

[5] Yannick Bukschat and Marcus Vetter. Efficientpose—an efficient, accurate and scalable end-to-end 6d multi object pose estimation approach. *arXiv preprint arXiv: 2011.04307*, 2020.

[6] J. Deng, W. Dong, R. Socher, L. Li, Kai Li, and Li Fei-Fei. Imagenet: A large-scale hierarchical image database. In 2009 *IEEE Conference on Computer Vision and Pattern Recognition*, pages 248-255, 2009.

[7] Richard O Duda and Peter E Hart. Use of the hough transformation to detect lines and curves in pictures. *Communi-cations of the ACM*, 15 (1):11-15, 1972.

[8] A. Eggert and Robert Fisher. A comparison of four algorithms for estimating 3-d rigid transformations. 05 1998.

[9] Yuval Eldar, Michael Lindenbaum, Moshe Porat, and Yehoshua Y Zeevi. The farthest point strategy for progressive image sampling. *IEEE Transactions on Image Processing*, 6(9):1305-1315, 1997.

[10] Martin A Fischler and Robert C Bolles. Random sample consensus: a paradigm for model fitting with applications to image analysis and automated cartography. *Communications of the ACM*, 24(6):381-395, 1981.

[11] J. Gall, A. Yao, N. Razavi, L. Van Gool, and V. Lempit-sky. Hough forests for object detection, tracking, and action recognition. *IEEE Transactions on Pattern Analysis and Machine Intelligence*, 33(11):2188-2202, 2011.

[12] X. Gao, Xiaorong Hou, Jianliang Tang, and H. Cheng. Com-plete solution classification for the perspective-three-point problem. *IEEE Trans. Pattern Anal. Mach. Intell.*, 25:930-943, 2003.

[13] Kaiming He, Xiangyu Zhang, Shaoqing Ren, and Jian Sun. Deep residual learning for image recognition. In *Proceedings of the IEEE conference on computer vision and pattern recognition*, pages 770-778, 2016.

[14] Yisheng He, Wei Sun, Haibin Huang, Jianran Liu, Haoqiang Fan, and Jian Sun. Pvn3d: A deep point-wise 3d keypoints voting network for 6 dof pose estimation. In *Proceedings of the IEEE/CVF Conference on Computer Vision and Pattern Recognition (CVPR)*, June 2020.

[15] Stefan Hinterstoisser, Vincent Lepetit, Slobodan Ilic, Stefan Holzer, Gary Bradski, Kurt Konolige, and Nassir Navab. Model based training, detection and pose estimation of texture-less 3d objects in heavily cluttered scenes. In *Asian conference on computer vision*, pages 548-562. Springer, 2012.

[16] Tomáš Hodaň, Martin Sundermeyer, Bertram Drost, Yann Labbé, Eric Brachmann, Frank Michel, Carsten Rother, and Jiřı́ Matas. Bop challenge 2020 on 6d object localization. In *European Conference on Computer Vision*, pages 577-594. Springer, 2020.

[17] Berthold K. P. Horn, Hugh M. Hilden, and Shahriar Negah-daripour. Closed-form solution of absolute orientation using orthonormal matrices. *J. Opt. Soc. Am. A*, 5(7):1127-1135, July 1988.

[18] Yinlin Hu, Joachim Hugonot, Pascal Fua, and Mathieu Salzmann. Segmentation-driven 6d object pose estimation. In *Proceedings of the IEEE/CVF Conference on Computer Vision and Pattern Recognition*, pages 3385-3394, 2019.

[19] Wadim Kehl, Fabian Manhardt, Federico Tombari, Slobodan Ilic, and Nassir Navab. Ssd-6d: Making rgb-based 3d detection and 6d pose estimation great again. In *Proceedings of the IEEE international conference on computer vision*, pages 1521-1529, 2017.

[20] Yann Labbé, Justin Carpentier, Mathieu Aubry, and Josef Sivic. Cosypose: Consistent multi-view multi-object 6d pose estimation. In *European Conference on Computer Vision*, pages 574-591. Springer, 2020.

[21] Y. Lamdan and H. J. Wolfson. Geometric hashing: A general and efficient model-based recognition scheme. In [1988 *Proceedings*] *Second International Conference on Computer Vision*, pages 238-249, 1988.

[22] Yi Li, Gu Wang, Xiangyang Ji, Yu Xiang, and Dieter Fox. Deepim: Deep iterative matching for 6d pose estimation. In *Proceedings of the European Conference on Computer Vision (ECCV)*, pages 683-698, 2018.

[23] Tsung-Yi Lin, Michael Maire, Serge Belongie, James Hays, Pietro Perona, Deva Ramanan, Piotr Dolla'r, and C Lawrence Zitnick. Microsoft coco: Common objects in context. In *European conference on computer vision*, pages 740-755. Springer, 2014.

[24] Jonathan Long, Evan Shelhamer, and Trevor Darrell. Fully convolutional networks for semantic segmentation. In *Proceedings of the IEEE conference on computer vision and pattern recognition*, pages 3431-3440, 2015.

[25] David G Lowe. Object recognition from local scale-invariant features. In *Proceedings of the seventh IEEE international conference on computer vision*, volume 2, pages 1150-1157. Ieee, 1999.

[26] Fabian Manhardt, Diego Martin Arroyo, Christian Rup-precht, Benjamin Busam, Tolga Birdal, Nassir Navab, and Federico Tombari. Explaining the ambiguity of object detection and 6d pose from visual data. In *Proceedings of the IEEE/CVF International Conference on Computer Vision (ICCV)*, October 2019.

[27] Fabian Manhardt, Wadim Kehl, Nassir Navab, and Federico Tombari. Deep model-based 6d pose refinement in rgb. In *Proceedings of the European Conference on Computer Vision (ECCV)*, pages 800-815, 2018.

[28] M. Mohamad, M. T. Ahmed, D. Rappaport, and M. Greenspan. Super generalized 4pcs for 3d registration. In 2015 *International Conference on 3D Vision*, pages 598-606, 2015.

[29] M. Mohamad, D. Rappaport, and M. Greenspan. Generalized 4-points congruent sets for 3d registration. In 2014 *2nd International Conference on 3D Vision*, volume 1, pages 83-90, 2014.

[30] Markus Oberweger, Mandi Rad, and Vincent Lepetit. Making deep heatmaps robust to partial occlusions for 3d object pose estimation. In *Proceedings of the European Conference on Computer Vision (ECCV)*, pages 119-134, 2018.

[31] Clark F. Olson. Efficient pose clustering using a randomized algorithm, 1997.

[32] George Papandreou, Tyler Zhu, Liang-Chieh Chen, Spyros Gidaris, Jonathan Tompson, and Kevin Murphy. Person-lab: Person pose estimation and instance segmentation with a bottom-up, part-based, geometric embedding model. In *Proceedings of the European Conference on Computer Vision (ECCV)*, pages 269-286, 2018.

[33] Kiru Park, Timothy Patten, and Markus Vincze. Pix2pose: Pixel-wise coordinate regression of objects for 6d pose estimation. In *Proceedings of the IEEE/CVF International Conference on Computer Vision*, pages 7668-7677, 2019.

[34] Kiru Park, Timothy Patten, and Markus Vincze. Neural object learning for 6d pose estimation using a few cluttered images. In Andrea Vedaldi, Horst Bischof, Thomas Brox, and Jan-Michael Frahm, editors, *Computer Vision—ECCV 2020*, pages 656-673, Cham, 2020. Springer International Publishing.

[35] Georgios Pavlakos, Xiaowei Zhou, Aaron Chan, Konstanti-nos G Derpanis, and Kostas Daniilidis. 6-dof object pose from semantic keypoints. In 2017 *IEEE international conference on robotics and automation (ICRA)*, pages 2011-2018. IEEE, 2017.

[36] *Sida* Peng, Yuan Liu, Qixing Huang, Xiaowei Zhou, and Hu-jun Bao. Pvnet: Pixel-wise voting network for 6 dof pose estimation. In *Proceedings of the IEEE/CVF Conference on Computer Vision and Pattern Recognition*, pages 4561-4570, 2019.

[37] Charles R. Qi, Or Litany, Kaiming He, and Leonidas J. Guibas. Deep hough voting for 3d object detection in point clouds. In *Proceedings of the IEEE/CVF International Conference on Computer Vision (ICCV)*, October 2019.

[38] Charles R Qi, Li Yi, Hao Su, and Leonidas J Guibas. Point-net++: Deep hierarchical feature learning on point sets in a metric space. *arXiv preprint arXiv:*1706.02413, 2017.

[39] Long Quan and Zhongdan Lan. Linear n-point camera pose determination. *IEEE Transactions on pattern analysis and machine intelligence*, 21 (8):774-780, 1999.

[40] Mandi Rad and Vincent Lepetit. Bb8: A scalable, accurate, robust to partial occlusion method for predicting the 3d poses of challenging objects without using depth. In *Proceedings of the IEEE International Conference on Computer Vision*, pages 3828-3836, 2017.

[41] Joseph Redmon and Ali Farhadi. Yolov3: An incremental improvement. *arXiv preprint arXiv:*1804.02767, 2018.

[42] Fred Rothganger, Svetlana Lazebnik, Cordelia Schmid, and Jean Ponce. 3d object modeling and recognition using local affine-invariant image descriptors and multi-view spatial constraints. *International journal of computer vision*, 66(3):231-259, 2006.

[43] Jianzhun Shao, Yuhang Jiang, Gu Wang, Zhigang Li, and Xiangyang Ji. Pfrl: Pose-free reinforcement learning for 6d pose estimation. In *IEEE/CVF Conference on Computer Vision and Pattern Recognition (CVPR)*, June 2020.

[44] Bugra Tekin, Sudipta N Sinha, and Pascal Fua. Real-time seamless single shot 6d object pose prediction. In *Proceedings of the IEEE Conference on Computer Vision and Pattern Recognition*, pages 292-301, 2018.

[45] Ameni Trabelsi, Mohamed Chaabane, Nathaniel Blanchard, and Ross Beveridge. A pose proposal and refinement network for better 6d object pose estimation. In *Proceedings of the IEEE/CVF Winter Conference on Applications of Computer Vision*, pages 2382-2391, 2021.

[46] Jonathan Tremblay, Thang To, Balakumar Sundaralingam, Yu Xiang, Dieter Fox, and Stan Birchfield. Deep object pose estimation for semantic robotic grasping of household objects. *arXiv preprint arXiv:*1809.10790, 2018.

[47] Chen Wang, Danfei Xu, Yuke Zhu, Roberto Marti'n-Marti'n, Cewu Lu, Li Fei-Fei, and Silvio Savarese. Densefusion: 6d object pose estimation by iterative dense fusion. In *Proceedings of the IEEE/CVF Conference on Computer Vision and Pattern Recognition*, pages 3343-3352, 2019.

[48] Gu Wang, Fabian Manhardt, Jianzhun Shao, Xiangyang Ji, Nassir Navab, and Federico Tombari. Self6d: Self-supervised monocular 6d object pose estimation. In *European Conference on Computer Vision*, pages 108-125. Springer, 2020.

[49] Yu Xiang, Tanner Schmidt, Venkatraman Narayanan, and Dieter Fox. Posecnn: A convolutional neural network for 6d object pose estimation in cluttered scenes. 2018.

[50] Sergey Zakharov, Ivan Shugurov, and Slobodan Ilic. Dpod: 6d pose object detector and refiner. In *Proceedings of the IEEE/CVF International Conference on Computer Vision*, pages 1941-1950, 2019.

The invention claimed is:

1. A method of processing an intensity-depth image to determine a pose of an object according to a set of keypoints, each keypoint being defined within a frame of reference of the object, the intensity-depth image comprising image data and depth data, the intensity-depth image having been obtained using an intensity-depth imaging camera, the method comprising:

for each keypoint of a plurality of keypoints selected from the set of keypoints:
  employing a machine learning algorithm to process the image data to determine, for each pixel of a plurality of pixels of the image, a corresponding estimated distance between a keypoint location and a respective 3D scene location, wherein a 3D scene location corresponding to a given pixel is a three-dimensional coordinate, defined in a camera reference frame, determined based on the depth data associated with the given pixel, the machine learning algorithm having been trained based on a set of reference intensity-depth images and corresponding known distances between the keypoint location of the keypoint and the 3D scene locations of the set of reference intensity-depth images, the set of reference intensity-depth images having been obtained with the object in a plurality of poses;
  for each pixel of the plurality of pixels, incrementing an accumulator space at a plurality of accumulator space locations residing on a sphere centered on the 3D scene location, the sphere having a radius equal to the estimated distance, the accumulator space being a three-dimensional space defined within a frame of reference of the intensity-depth imaging camera;
  identifying the keypoint location of the keypoint via detection of a global peak in the accumulator space;
employing the keypoint locations of the plurality of keypoints to determine a pose of the object, the pose comprising at least a three-dimensional position of the object.

2. The method according to claim 1 wherein the machine learning algorithm comprises at least one neural network.

3. The method according to claim 2 wherein the machine learning algorithm comprises a single neural network trained to determine the estimated distances associated with each keypoint of the plurality of keypoints.

4. The method according to claim 2 wherein the machine learning algorithm comprises a plurality of neural networks, each neural network being separately trained to determine a respective estimated distance associated with at least one keypoint.

5. The method according to claim 1 wherein a separate accumulator space is incremented for each keypoint of the plurality of keypoints.

6. The method according to claim 1 wherein a common accumulator space is incremented for all keypoints of the plurality of keypoints.

7. The method according to claim 1 wherein the machine learning algorithm is further configured to perform segmentation of the object from the image data, thereby obtaining segmented image data, and wherein the segmented image data is employed to select and employ a subset of pixels when incrementing the accumulator space.

8. The method according to claim 1 wherein at least one keypoint of the plurality of keypoints resides beyond an external surface of the object.

9. The method according to claim 1 wherein the plurality of keypoints are dispersed beyond a bounding box enclosing the object.

10. The method according to claim 9 wherein at least one keypoint of the plurality of keypoints resides at least two object radii from the object centroid.

11. The method according to claim 1 wherein the image data is colour image data.

12. The method according to claim 1 wherein the pose is a six-degree-of-freedom pose.

13. A system for processing an intensity-depth image to determine a pose of an object according to a set of keypoints, each keypoint being defined within a frame of reference of the object, the intensity-depth image comprising image data and depth data, the system comprising:

an intensity-depth imaging camera; and
control and processing circuitry operably coupled to said intensity-depth imaging camera, said control and processing circuitry comprising at least one processor and memory, said memory comprising instructions executable by said at least one processor for performing operations comprising:
obtaining the intensity-depth image from said intensity-depth imaging camera;
for each keypoint of a plurality of keypoints selected from the set of keypoints:
  employing a machine learning algorithm to process the image data to determine, for each pixel of a plurality of pixels of the image, a corresponding estimated distance between a keypoint location and a respective 3D scene location, wherein a 3D scene location corresponding to a given pixel is a three-dimensional coordinate, defined in a camera reference frame, determined based on the depth data associated with the given pixel, the machine learning algorithm having been trained based on a set of reference intensity-depth images and corresponding known distances between the keypoint location of the keypoint and the 3D scene locations of the set of reference intensity-depth images, the set of reference intensity-depth images having been obtained with the object in a plurality of poses;
  for each pixel of the plurality of pixels, incrementing an accumulator space at a plurality of accumulator space locations residing on a sphere centered on the 3D scene location, the sphere having a radius equal to the estimated distance, the accumulator space being a three-dimensional space defined within a frame of reference of said intensity-depth imaging camera;
  identifying the keypoint location of the keypoint via detection of a global peak in the accumulator space;
employing the keypoint locations of the plurality of keypoints to determine a pose of the object, the pose comprising at least a three-dimensional position of the object.

14. A method of processing an image to determine a pose of an object according to a set of keypoints, each keypoint being defined within a frame of reference of the object, the method comprising:

for each keypoint of a plurality of keypoints selected from the set of keypoints:
employing a machine learning algorithm to process the image to determine, for each pixel of a plurality of pixels of the image, a corresponding estimated distance between a projected keypoint location and a respective pixel location, wherein each pixel location is defined by a respective two-dimensional coordinate locating the pixel within an image plane of an imaging camera employed to obtain the image, and wherein the projected keypoint location is defined by a respective two-dimensional coordinate corresponding to a projection of a three-dimensional location of the keypoint onto the image plane, the machine learning algorithm having been trained based on a set of reference images and corresponding known distances between the projected keypoint location of the keypoint and pixel locations of the set of reference images, the set of reference images having been obtained with the object in a plurality of poses;
for each pixel of the plurality of pixels, incrementing an accumulator space at a plurality of accumulator space locations residing along a circle centered on the pixel location, the circle having a radius equal to the estimated distance, the accumulator space being a two-dimensional space defined within the image plane of the imaging camera;
identifying the projected keypoint location of the keypoint via detection of a global peak in the accumulator space; and employing the projected keypoint locations of the plurality of keypoints to determine the pose of the object, the pose comprising at least a three-dimensional position of the object.

15. The method according to claim 14 wherein the machine learning algorithm comprises at least one neural network.

16. The method according to claim 15 wherein the machine learning algorithm comprises a single neural network trained to determine the estimated distances associated with each keypoint of the plurality of keypoints.

17. The method according to claim 15 wherein the machine learning algorithm comprises a plurality of neural networks, each neural network being separately trained to determine a respective estimated distance associated with at least one keypoint of the plurality of keypoints.

18. The method according to claim 14 wherein a separate accumulator space is incremented for each keypoint of the plurality of keypoints.

19. The method according to claim 14 wherein a common accumulator space is incremented for all keypoints of the plurality of keypoints.

20. The method according to claim 14 wherein the machine learning algorithm is further configured to perform segmentation of the object from the image, thereby obtaining segmented image data, and wherein the segmented image data is employed to select and employ a subset of pixels when incrementing the accumulator space.

21. The method according to claim 14 wherein the plurality of keypoints are dispersed beyond a bounding box enclosing the object.

22. The method according to claim 21 wherein at least one keypoint of the plurality of keypoints resides at least two object radii from the object centroid.

23. The method according to claim 14 wherein the image data is colour image data.

24. The method according to claim 14 wherein the pose is a six-degree-of-freedom pose.

25. The method according to claim 14 wherein a Perspective-n-Point algorithm is employed to determine the pose of the object from the projected keypoint locations.

26. A system for processing an image to determine a pose of an object according to a set of keypoints, each keypoint being defined within a frame of reference of the object, the system comprising:

a camera; and
control and processing circuitry operably coupled to said camera, said control and processing circuitry comprising at least one processor and memory, said memory comprising instructions executable by said at least one processor for performing operations comprising:
obtaining the image from the camera;
for each keypoint of a plurality of keypoints selected from the set of keypoints:
employing a machine learning algorithm to process the image to determine, for each pixel of a plurality of pixels of the image, a corresponding estimated distance between a projected keypoint location and a respective pixel location, wherein each pixel location is defined by a respective two-dimensional coordinate locating the pixel within an image plane of said camera employed to obtain the image, and wherein the projected keypoint location is defined by a respective two-dimensional coordinate corresponding to a projection of a three-dimensional location of the keypoint onto the image plane, the machine learning algorithm having been trained based on a set of reference images and corresponding known distances between the projected keypoint location of the keypoint and pixel locations of the set of reference images, the set of reference images having been obtained with the object in a plurality of poses;
for each pixel of the plurality of pixels, incrementing an accumulator space at a plurality of accumulator space locations residing along a circle centered on the pixel location, the circle having a radius equal to the estimated distance, the accumulator space being a two-dimensional space defined within the image plane of said camera;
identifying the projected keypoint location of the keypoint via detection of a global peak in the accumulator space; and
employing the projected keypoint locations of the plurality of keypoints to determine the pose of the object, the pose comprising at least a three-dimensional position of the object.

27. A method of processing a point cloud to determine a pose of an object according to a set of keypoints, each keypoint being defined within a frame of reference of the object, the point cloud having been obtained using a 3D depth sensing device, the method comprising:

for each keypoint of a plurality of keypoints selected from the set of keypoints:
employing a machine learning algorithm to process the point cloud to determine, for each point cloud point of a plurality of point cloud points, a corresponding estimated distance between a keypoint and the point cloud point, the machine learning algorithm having been trained based on a set of reference point clouds and corresponding known distances between the keypoint and the point cloud points of the set of reference point clouds, the set of reference point clouds having been obtained with the object in a plurality of poses;

for each point cloud point, incrementing an accumulator space based on a plurality of accumulator space locations residing on a sphere centered on the point cloud point, the sphere having a radius equal to the estimated distance, the accumulator space being defined within a frame of reference of the 3D depth sensing device;

identifying a location of the keypoint via detection of a peak within the accumulator space;

employing the keypoint locations of the plurality of keypoints to determine the pose of the object, the pose comprising at least a three-dimensional position of the object.

28. The method according to claim 27 wherein the machine learning algorithm comprises at least one neural network.

29. The method according to claim 28 wherein the machine learning algorithm comprises a single neural network trained to determine the estimated distances associated with each keypoint of the plurality of keypoints.

30. The method according to claim 28 wherein the machine learning algorithm comprises a plurality of neural networks, each neural network being separately trained to determine a respective estimated distance associated with at least one keypoint.

31. The method according to claim 27 wherein a separate accumulator space is incremented for each keypoint of the plurality of keypoints.

32. The method according to claim 27 wherein a common accumulator space is incremented for all keypoints of the plurality of keypoints.

33. The method according to claim 27 wherein the plurality of keypoints are dispersed beyond a bounding box enclosing the object.

34. The method according to claim 33 wherein at least one keypoint of the plurality of keypoints resides at least two object radii from the object centroid.

35. The method according to claim 27 wherein the pose is a six-degree-of-freedom pose.

36. The method according to claim 27 wherein the accumulator space is a continuous accumulator space, and wherein the keypoint location is identified via detection of the peak within the continuous accumulator space.

37. The method according to claim 27 wherein the accumulator space is a discrete accumulator space comprising a set of accumulator space points, and wherein the keypoint location is identified via detection of a peak point density within the accumulator space.

38. A system for processing of processing a point cloud to determine a pose of an object according to a set of keypoints, each keypoint being defined within a frame of reference of the object, the system comprising:

a 3D depth sensing device; and control and processing circuitry operably coupled to said 3D depth sensing device, said control and processing circuitry comprising at least one processor and memory, said memory comprising instructions executable by said at least one processor for performing operations comprising:

obtaining the point cloud from said 3D depth sensing device;

for each keypoint of a plurality of keypoints selected from the set of keypoints:

employing a machine learning algorithm to process the point cloud to determine, for each point cloud point of a plurality of point cloud points, a corresponding estimated distance between a keypoint and the point cloud point, the machine learning algorithm having been trained based on a set of reference point clouds and corresponding known distances between the keypoint and the point cloud points of the set of reference point clouds, the set of reference point clouds having been obtained with the object in a plurality of poses;

for each point cloud point, incrementing an accumulator space based on a plurality of accumulator space locations residing on a sphere centered on the point cloud point, the sphere having a radius equal to the estimated distance, the accumulator space being defined within a frame of reference of said 3D depth sensing device;

identifying a location of the keypoint via detection of a peak within the accumulator space;

employing the keypoint locations of the plurality of keypoints to determine the pose of the object, the pose comprising at least a three-dimensional position of the object.

* * * * *